(12) United States Patent
Yagura

(10) Patent No.: US 11,285,805 B2
(45) Date of Patent: Mar. 29, 2022

(54) VEHICLE LID DEVICE

(71) Applicant: NIFCO INC., Yokosuka (JP)

(72) Inventor: Seiji Yagura, Yokosuka (JP)

(73) Assignee: NIFCO INC., Yokosuka (JP)

( * ) Notice: Subject to any disclaimer, the term of this patent is extended or adjusted under 35 U.S.C. 154(b) by 177 days.

(21) Appl. No.: 16/630,718

(22) PCT Filed: Jul. 10, 2018

(86) PCT No.: PCT/JP2018/025997
§ 371 (c)(1),
(2) Date: Jan. 13, 2020

(87) PCT Pub. No.: WO2019/013192
PCT Pub. Date: Jan. 17, 2019

(65) Prior Publication Data
US 2020/0198463 A1    Jun. 25, 2020

(30) Foreign Application Priority Data

Jul. 14, 2017    (JP) .............................. JP2017-137838

(51) Int. Cl.
*B60K 15/05* (2006.01)
*E05F 1/10* (2006.01)
*B60K 15/04* (2006.01)

(52) U.S. Cl.
CPC .......... *B60K 15/05* (2013.01); *B60K 15/0409* (2013.01); *E05F 1/1008* (2013.01);
(Continued)

(58) Field of Classification Search
CPC ................ B60K 15/05; B60K 15/0409; B60K 2015/0515; D05F 1/1008
(Continued)

(56) References Cited

U.S. PATENT DOCUMENTS 10,513,174 B2 * 12/2019 Watanabe .......... B60K 15/0409
2014/0339834 A1 * 11/2014 Alexander ............ E05C 19/022
292/96
(Continued)

FOREIGN PATENT DOCUMENTS

JP    2005-343367 A    12/2005
JP    2010-280243 A    12/2010
(Continued)

OTHER PUBLICATIONS

Europe Patent Office, "Search Report for European Patent Application No. 18832172.3," dated Jan. 18, 2021.
(Continued)

*Primary Examiner* — Mahmoud Gimie
(74) *Attorney, Agent, or Firm* — Manabu Kanesaka

(57) ABSTRACT

The lid device for vehicle includes a link member supporting a lid to open and close; and a basing member moving the lid from a fully-closed position to a first reference position which is a partly-open position, and moving the lid from a second reference position which is further in the open direction than the first reference position to a fully-open position. The link member includes first and second link members pivotally supported at one end on the rear side of the lid, and pivotally supported at the other end within the housing. The biasing member has a pop-up contact part for switching the lid from the closed position to the first reference position, and a deadlock contact part inner surface for switching between biasing toward the first reference position and biasing toward the fully opening position with the second reference position in between.

8 Claims, 20 Drawing Sheets

(52) U.S. Cl.
CPC ............... *B60K 2015/0461* (2013.01); *B60K 2015/0515* (2013.01)

(58) Field of Classification Search
USPC .......................................................... 49/386
See application file for complete search history.

(56) References Cited

U.S. PATENT DOCUMENTS

2017/0368928 A1* 12/2017 Mori ..................... B60K 15/05
2020/0130505 A1* 4/2020 Yagura ................... B60K 15/05

FOREIGN PATENT DOCUMENTS

| | | |
|---|---|---|
| JP | 2013-112228 A | 6/2013 |
| JP | 2015-98284 A | 5/2015 |
| JP | 2017-047827 A | 3/2017 |
| KR | 20120000875 A | 1/2012 |
| WO | 2017/005630 A1 | 1/2017 |

OTHER PUBLICATIONS

PCT/ISA/210, "International Search Report for International Application No. PCT/JP2018/025997," dated Oct. 2, 2018.

* cited by examiner

VEHICLE LID DEVICE

TECHNICAL FIELD

The present invention relates to a vehicle lid device.

BACKGROUND ART

FIGS. 18(a), 18 (b), and 19 show a vehicle lid device disclosed in Patent Literature 1 below. The lid device 1 includes a housing (saucer) 2 in which an oil filler port and the like is disposed, a lid (lid member) 3 that opens and closes an opening 2a, an arm 3b that extends into the lid 3 and connects and supports the lid 3 to the housing 2, and a spring 5 as an urging means that pops-up, by an urging force, the lid 3 from a closed position to a first reference position at which the lid 3 is opened or switches (hereinafter, referred to as deadlock) between urging to the first reference position as a closing direction and urging to a fully open position, with the second reference position, which is in an opening direction, therebetween.

The housing 2 includes a cylindrical part 2b and a horizontal extending part 2c continuously connected to the cylindrical part. The lid 3 includes a lid body 3a that opens and closes the opening 2a and a goose neck type arm 3b. The arm 3b is disposed in the horizontal extending part 2c and is rotatably shaft-supported by a pin 4. Reference numeral 3c denotes an abutting portion on which the spring 5 (elastic deformation part 5c described later) abuts. As shown in FIG. 11(b), the spring 5 has a body side fixing part 5a that extends in a vertical direction and is fixed to the horizontal extending part 2c, a body side horizontal part 5b that extends in a horizontal direction from a lower end of the fixing part 5a, the elastic deformation part 5c that extends upward from an end portion of a lid side of the horizontal part 5b, a lid side horizontal part 5d that extends in a horizontal direction from an upper end of the elastic deformation part 5c, and a lid side fixing part 5e that moves together with an arm part while extending downward from an end portion of a lid side horizontal part 5d and fixed to the arm part 3b. In addition, the elastic deformation part 5c includes an obliquely extending part 5c1 that extends obliquely upward from the end portion of the horizontal portion 5b, and a vertically extending part 5c2 that extends downward from the end portion of the lid side horizontal portion 5d. Reference numeral 5f denotes a folded portion that extends in a horizontal direction from an upper end of the body side horizontal part 5a.

The spring 5 is assembled in a state in which the body side fixing part 5a is fixed to the horizontal extending part 2c, the lid side fixing part 5e is fixed to the arm part 3b, and an urging force is applied to the lid 3 in an expansion and contraction direction. In addition, depending on a rotation position of the lid 3, the spring 5 may add, to the lid 3, an urging force (the urging force is referred to as "first urging force") in a direction substantially perpendicular to the expansion and contraction direction, in addition to an urging force (the urging force is referred to as "second urging force") in the expansion and contraction direction. That is, in this structure, the elastic deformation part 5c is elastically deformed by pushing the lid 3 in a closing direction of the lid 3, and is applied with the first urging force for pop-up that urges the lid 3 in the opening direction from the spring 5 (first urging part). In addition, when the lid fixing part 5e is closer to a closing side than an imaginary line 100 connecting between a rotation center (pin 4) of the lid 3 and the body side fixing part 5a, the second urging force acts in a direction in which the lid 3 is closed, and when the lid fixing part 5e is closer to an opening side, the second urging force acts in a direction in which the lid 3 is opened. That is, the spring 5 acts for a deadlock that urges the lid 3 to the second reference position beyond the first reference position in the closing direction and urges the lid 3 from the second reference position to the fully open position in the opening direction.

Therefore, as the lid device, the lid is locked by a lock mechanism (not shown) at the closed position, and is rotated to the first reference position by the first urging force of the spring by unlocking of the lock mechanism. Thereafter, when the lid is rotated to the second reference position, it is rotated from the second reference position to the fully open position by the second urging force of the spring.

CITATION LIST

Patent Literature

Patent Literature 1: JP 2015-98284 A

SUMMARY OF INVENTION

Technical Problem

In the lid device, the second urging force is applied by the elastic force in the expansion and contraction direction of the spring and the first urging force is applied by the elastic force in the direction substantially perpendicular to the expansion and contraction direction, so that a single spring independently generates the urging force in two different directions, thereby increasing space efficiency and improving a degree of freedom in layout of each part. However, in such a structure, the lid is spaced apart from the housing at the fully open position, and therefore the design is impaired or the housing is difficult to be compact due to the presence of the horizontal extending part. In addition, in the lid assembly operation, the arm is pivotally supported with a pin or the like in a state in which the arm is inserted into an inner part side of the horizontal extending part, or the spring should lock the body side fixing part at a fixed position in the horizontal extending part, such that workability is poor.

An object of the present invention is to solve the above-mentioned problems and provide a vehicle lid device that enables a housing to be compact and has excellent design in a structure in which a lid is moved by an urging force for pop-up and deadlock. In addition, the good lid assembly operability is provided. Other objects will be clarified in the following explanation.

Solution to Problem

In order to achieve the above object, according to a first aspect of the present invention, a vehicle lid device includes a housing in which an oil filler port or an electric charging port is placed inside an opening, a lid that opens and closes the opening of the housing, a link member that connects and supports the lid to the housing so as to be openable and closable, and an urging member that moves, by an urging force, the lid from a closed position to a first reference position at which the lid is in a middle of opening, and moves, by the urging force, the lid from a second reference position which is positioned further in an opening direction than the first reference position to a fully open position, in which the link member includes a first link member and a second link member of which one end is pivotally supported on a back side of the lid and the other end is pivotally supported by a base member provided in the housing, and the urging member includes an abutting portion for pop-up (which means an abutting portion as a main point which the urging member contacts when the lid is jumped, that is, popped-up, the same applies to the following. For example, in a first embodiment of the present invention, one leg portion of a first link member, and in a second embodiment, a first link member 7) that switches the lid from the closed position to the first reference position and an abutting portion (which means an abutting portion as a main point with the urging member contacting when switching in the urging direction, that is, deadlocking, the same applies to the following. For example, in the first embodiment of the present invention, a leg portion (the other leg portion) of the first link member, and in the second embodiment of the present invention, a stepped portion 72a of the first link member 7) for deadlock that switches urging to the first reference position and urging to the fully open position, with the second reference position therebetween.

According to the first aspect of the present invention, the urging force for pop-up that jumps the lid from the closed position to the first reference position and the urging force for deadlock that switches the urging from the second reference position to the fully open position and the urging to the first reference position are obtained by a single urging member, and as is clear from each embodiment, the movement of the lid can be controlled by two link members to promote compactness or simply inside the housing or simplify the assembly of the urging member and the assembly to the housing by the base member provided in the housing.

The present invention as described above may be embodied as specified in the following second to fifth aspects.

(Second aspect) The urging member is disposed between the first link member and the base member, the abutting portion for pop-up is a portion (for example, an outer surface 41a of one leg portion described later) disposed on the lid side of the first link member, and the abutting portion for deadlock is a portion (for example, an inner surface 41b for the other leg portion described later) disposed on the base member side of the first link member. This is specified based on the first embodiment of the present invention described later.

According to the second aspect of the present invention, the urging member is disposed between the first link member and the base member, and the first link member has the abutting portion for pop-up and the abutting portion for deadlock disposed on an opposite surface, thereby maintaining simple and good workability and assembly performance.

(Third aspect) The urging member is disposed between the first link member and the second link member, the abutting portion for pop-up is a predetermined portion (for example, an overhanging part 73 described later) of the first link member, and the abutting portion for deadlock is a predetermined portion (for example, a stepped portion 72a described later) of the first link member). This is specified based on the second embodiment of the present invention.

According to the third aspect of the present invention, compared to the second aspect, since the urging member is disposed between the two link members, the second link member can always be supported without rattling, and in addition, since the abutting portion for pop-up is a predetermined portion of the first link member and the abutting portion for deadlock is a predetermined portion of the first link member, the degree of freedom in design can be increased.

(Fourth aspect) The base member is configured to have a first abutting portion (for example, a window 35a described later) for an urging member corresponding to the abutting portion for pop-up, and a second abutting portion (for example, a connection part 33b described above) for an urging member corresponding to the abutting portion for deadlock. This is a specified based on the first embodiment of the present invention.

According to the fourth aspect of the present invention, in the second aspect, since the base member has the first abutting portion for the urging member corresponding to the abutting portion for pop-up, and the second abutting portion for the urging member corresponding to the abutting portion for deadlock, the base member is connected to the lid and is finally assembled in the housing, for example, from the state in which the base member, the two link members, and the urging member are assembled.

(Fifth aspect) The first abutting portion for the urging member is a surface (for example, a lower back surface of the window 35a described later) disposed on the second link member side of the base member, and the second abutting portion for the urging member is a surface (for example, a front side of the connection part 33b described later) disposed on the first link member side of the base member.

In the fifth aspect of the present invention, since the first abutting portion for the urging member is a surface disposed on the second link member side of the base member, and the second abutting portion for the urging member is a surface disposed on the first link member side of the base member, the vehicle lid device becomes simple.

(Sixth aspect) The second link member has the first abutting portion (for example, a front side of an overhanging part 86 described later) for the urging member corresponding to the abutting portion for pop-up, and the base member is configured to have the second abutting portion (for example, a guide groove 33c described later) for the urging member corresponding to the abutting portion for deadlock. This is specified based on the second embodiment of the present invention.

In the sixth aspect of the present invention, since the second link member has the first abutting portion for the urging member corresponding to the abutting portion for pop-up, and the base member has the second abutting for the urging member corresponding to the abutting portion for deadlock, the vehicle lid device becomes simple.

(Seventh aspect) The urging member is a torsion coil spring.

According to the seventh aspect of the present invention, since the urging member is the twist coil spring, the necessary urging force can be easily obtained by using both ends of a winding part (coil part). As a specific example, in the state in which the urging member is supported by the first link member using the winding part, the urging force for pop-up is obtained using one end side of the winding part, or the urging from the second reference position to the first reference position and the urging from the second reference position to the fully open position are obtained using the other end side of the winding part.

BRIEF DESCRIPTION OF DRAWINGS

FIGS. 1(a) and 1(b) show a lid device of the first embodiment of the present invention which is mounted on a vehicle body side, wherein FIG. 1(a) is a schematic diagram showing a lid in a closed position, and FIG. 1(b) is shown in a first reference position of the lid.

DESCRIPTION OF EMBODIMENTS

Figure 1A:
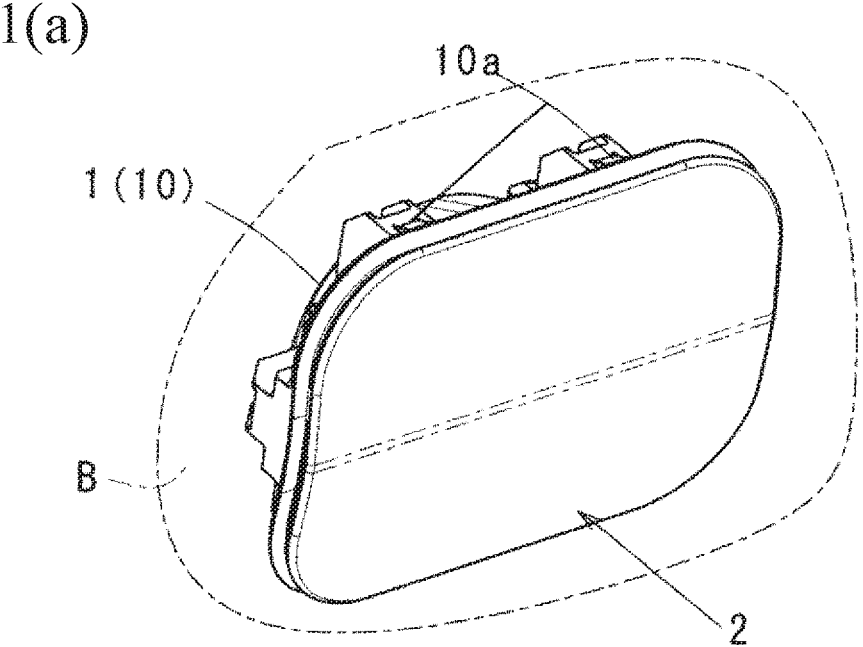

A best mode for carrying out the present invention will be described with reference to the accompanying drawings. In this description, a structure of a lid device according to a first embodiment of the present invention, operation characteristics of the lid device, a structure of a lid device according to the second embodiment of the present invention, and operation characteristics of the lid device will be described in this order.

Structure of First Embodiment of the Present Invention

In FIGS. 1(a) to 4, a lid device according to the present embodiment includes a substantially container-shaped housing 1 with an upper opening that partitions a space 12 for an oil filler port or an electric filling port, a lid 2 that opens and closes the upper opening of the housing 1, a base member 3 that is mounted on an inner periphery of the housing 1, and first and second link members 4 and 5 as link members that support the lid 2 so that the lid 2 can be opened and closed with respect to the base member 3, in which the lid 2 is rotatably supported by the housing 1 via the base member 3 and the two link members 4 and 5. In addition, the lid 2 includes a lid body 20 and a lid outer 27 mounted on a design surface of the lid body. Note that the housing 1, the lid body 20, the lid outer 27, the base member 3, the first link member 4, and the second link 5 are made of resin, but may be made of materials other than the resin.

Figure 7:
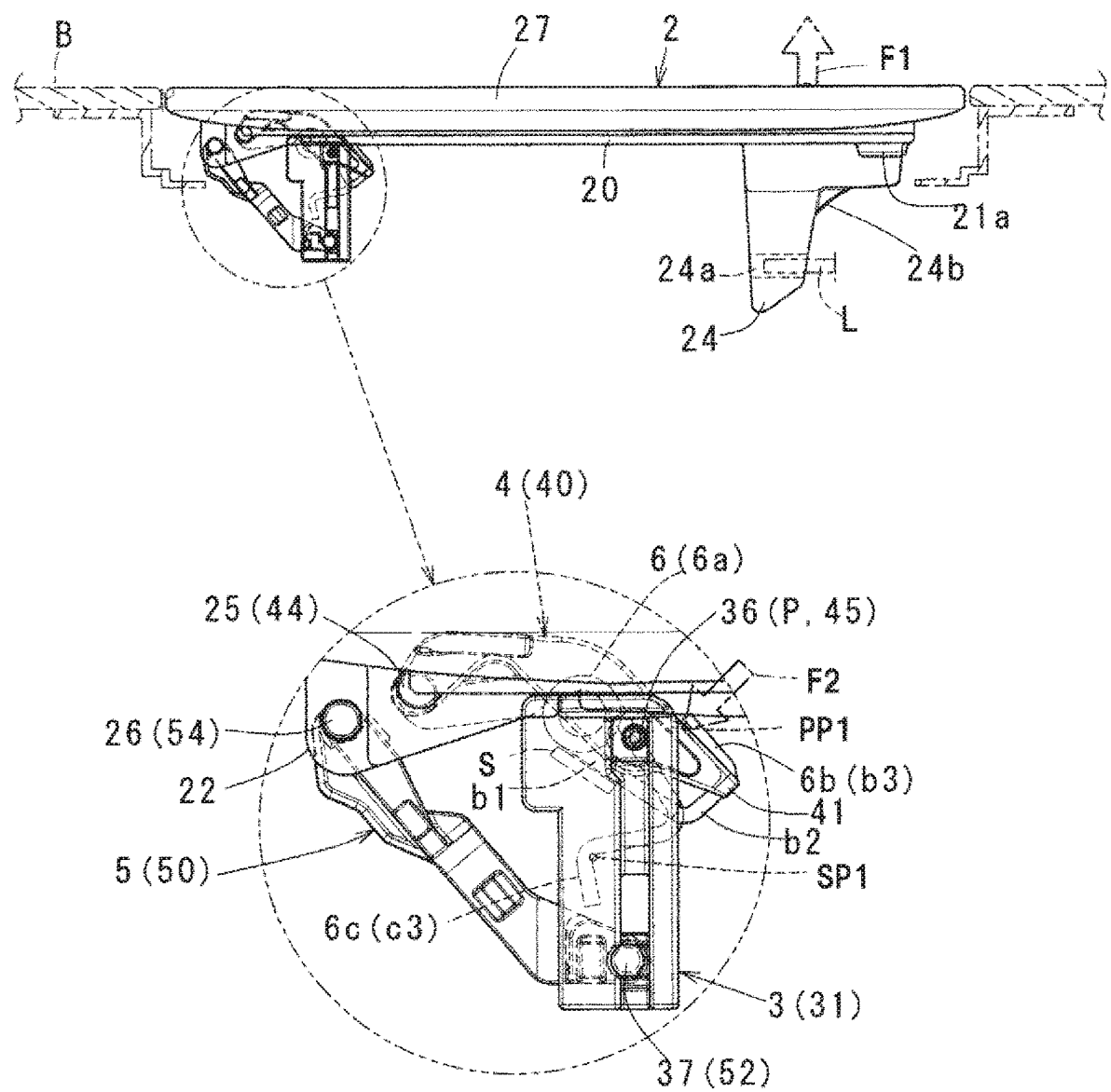
FIG. 7 is a schematic diagram showing the lid device at a closed position of the lid.
Figure 8:
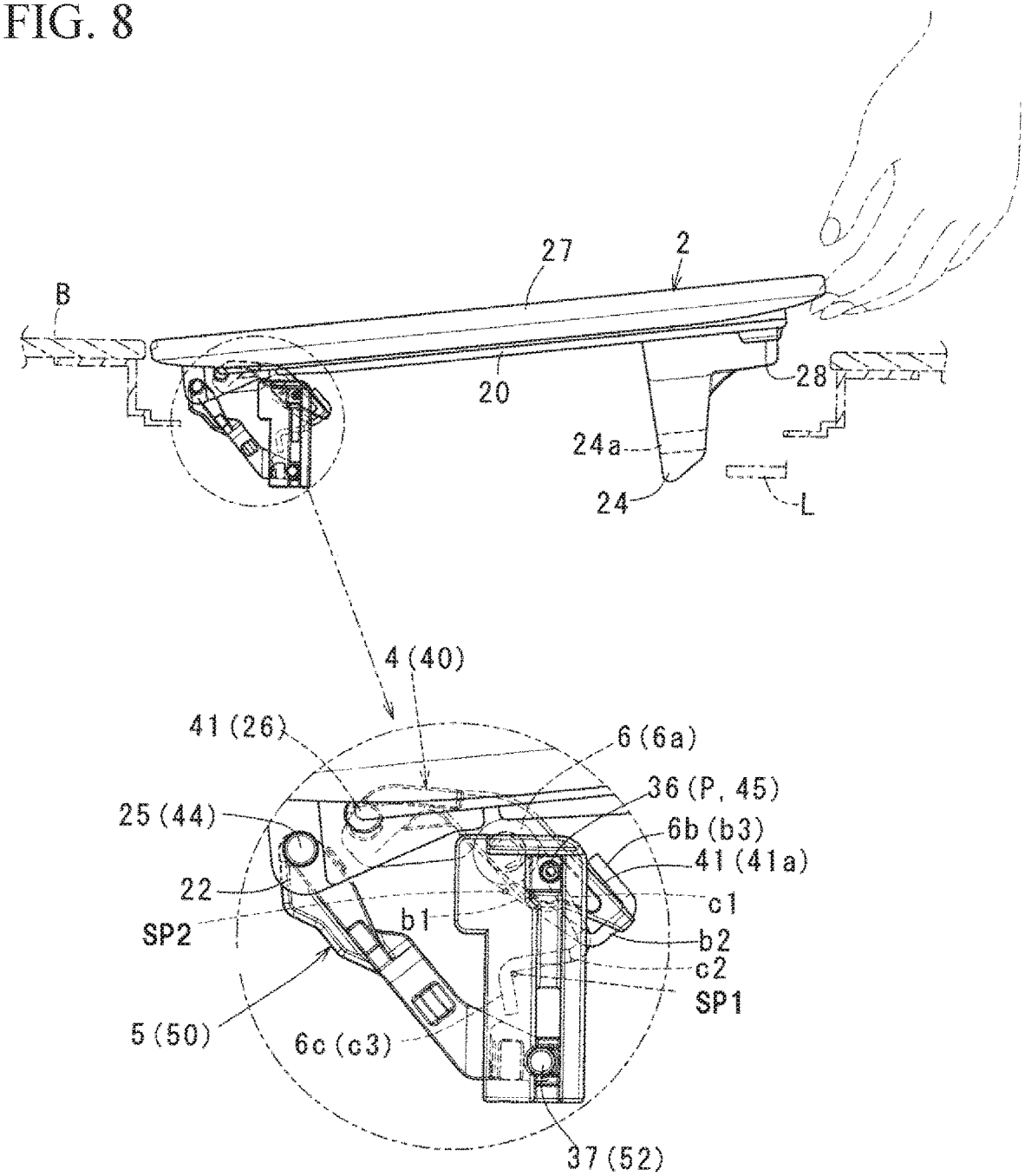
FIG. 8 is a schematic diagram showing the lid device at a first reference position of the lid.
Figure 10:
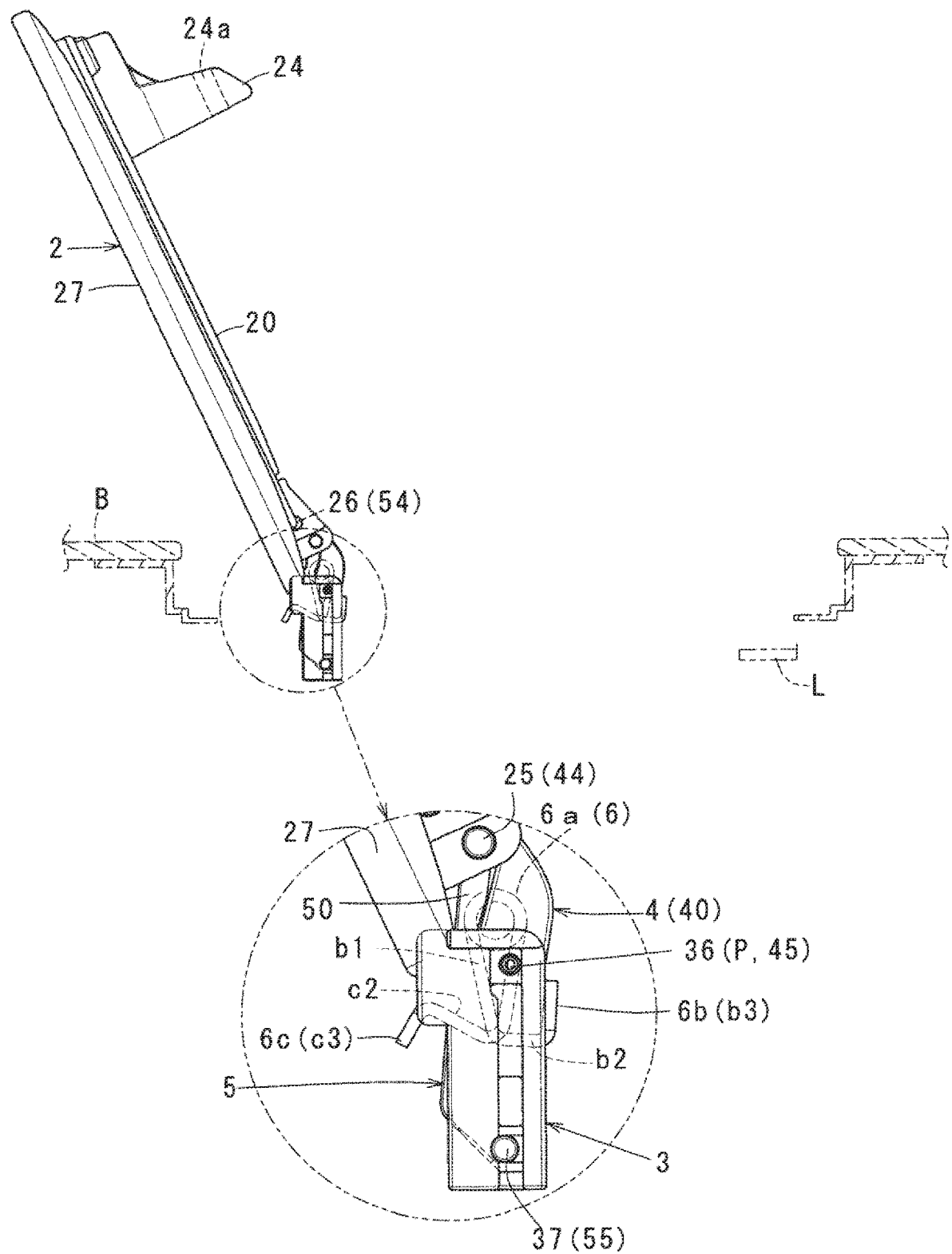
FIG. 10 is a schematic diagram showing the lid device at a fully open position of the lid.

In other words, the lid 2 is locked at the closed position shown in FIG. 7 by a lock member of a lock means L mounted on an outer periphery of the housing 1. The locking is unlocked, for example, by unlocking the lock means L via an opener in a vehicle cabin, or unlocked in conjunction with an unlocking operation of a door lock. Then, the lid 2 is rotated from the closed position to a first reference position which is slightly opened as shown in FIG. 8, by an urging force of an urging member 7. When the lid 2 is rotated in an opening direction by a hand or the like, an urging direction of an urging member 7 is reversed at a second reference position, and then, as shown in FIG. 10, the lid 2 is rotated in a fully opening direction shown by a solid line of FIG. 10 by the urging force of the urging member 6. Details are as follows.

Figure 1B:
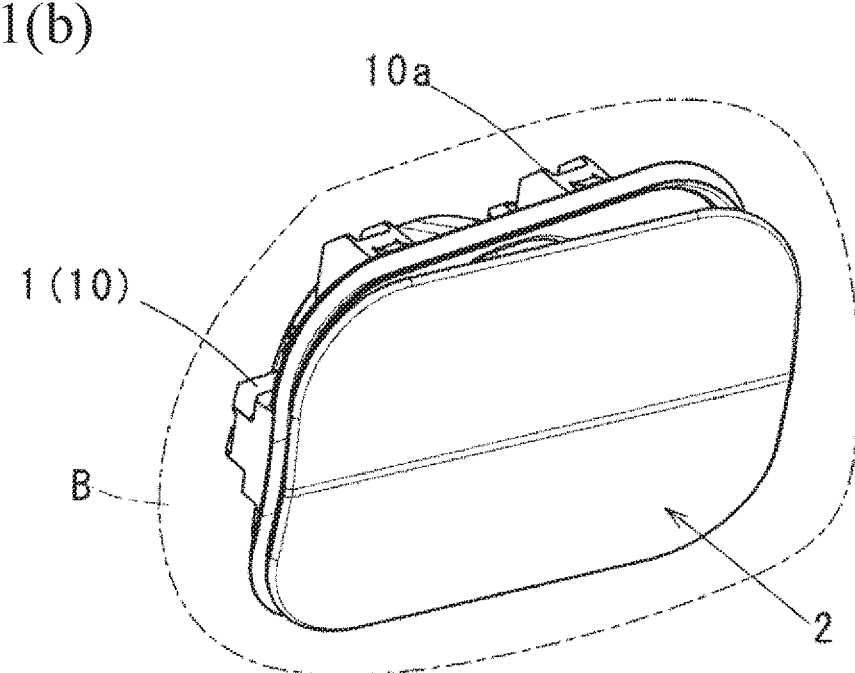
Figure 3:
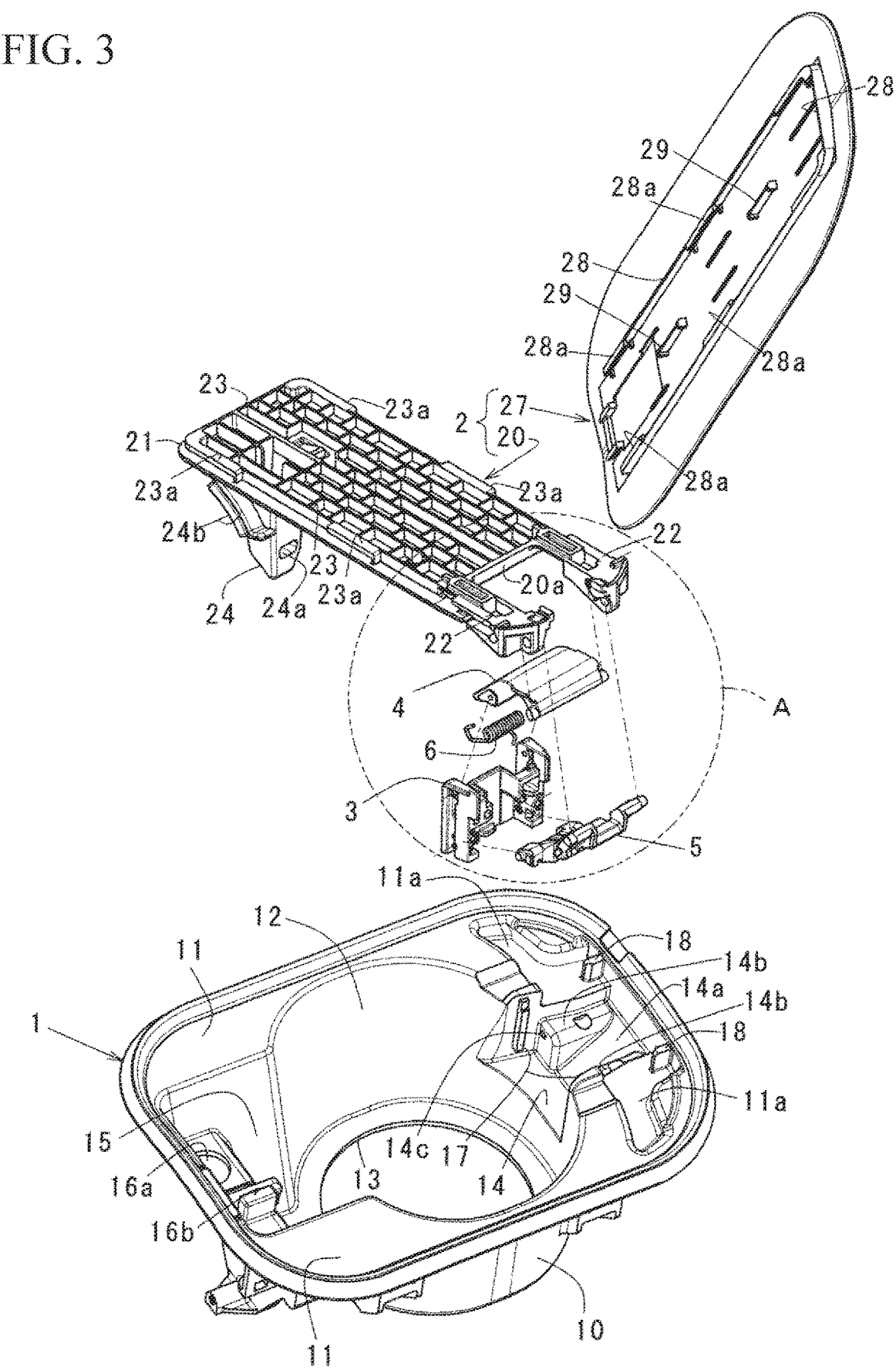
FIG. 3 is a schematic exploded view showing members of the lid device.

As shown in FIG. 3 and FIGS. 1(a) and 1(b), the housing 1 has an upper periphery of a cylindrical part 10 formed on a substantially spherical flange part, and includes a step 11 that is provided inside the flange part and receives the lid 2, a plurality of elastic locking claws 10a that protrude on an outer periphery of the flange part, a circular through hole 13 that is provided on a bottom wall of the cylindrical part 10, a recess 14 that is provided on an inner periphery thereof and has a base member 3 provided therein and an inclined surface 14a on a back side of the recess 14, overhanging parts 14b that are provided on both sides of the inclined surface 14a, amounting hole 14c that is provided on the overhanging part 14b, a shallow dent 11a that is provided at a position corresponding to an upper side of the overhanging part 14b in the step 11, and a deep dent 15 that is disposed at a position facing the recess 14 in the inner periphery.

Among those, each elastic locking claw 10a passes through an opening of a mounting frame while being elastically reduced in diameter when the lid device is mounted on the mounting frame fixed inside a body B, and can be mounted to be prevented from falling out by being restored simultaneously with the passing. The through hole 13 can be connected to a connecting pipe on a fuel tank side or can be provided with an electric charging mechanism and the like. The recess 14 has a vertical rib-shaped ridge 17 on an opposing inner surface. Both ridges 17 are engaged with a groove portion 32 of the base member 3 described later, so the base member 3 can be mounted on the recess 14. The dent 11a allows a proximal end side of the lid 2 to escape when the lid 2 is rotated from the closed position to the opening direction. The dent 15 allows a lid side engaging piece 27 to escape at the closed position of the lid 2 and has a through hole (not shown) provided in the partition wall of the dent 15. Reference numeral 16a is a fitting hole, and reference numerals 16b and 18 are guide pieces.

Figure 4:
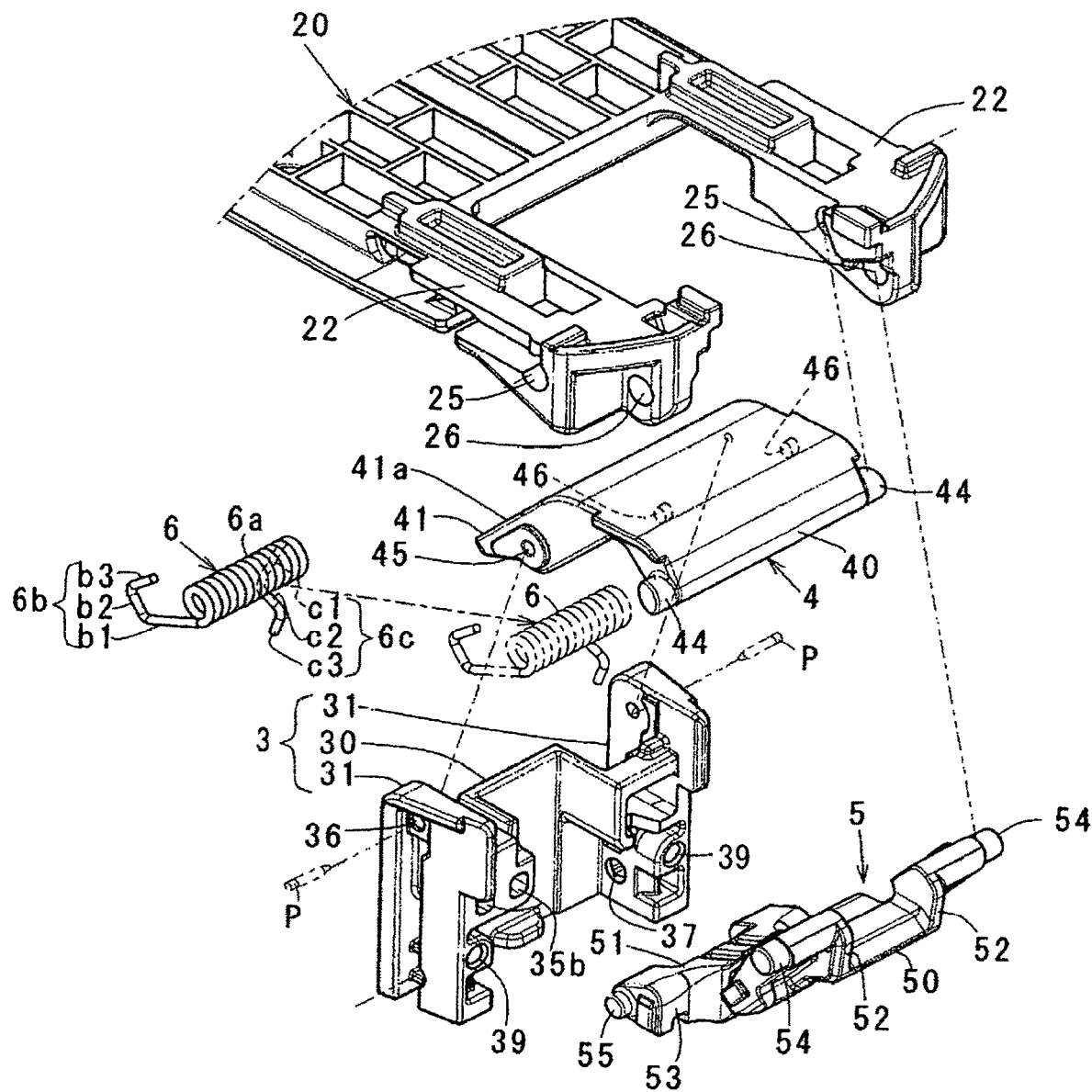
FIG. 4 is an enlarged view of part A in FIG. 3.

The lid 2 includes a lid body 20 to which each link member 3 and 4 is connected as shown in FIGS. 3 and 4, and a lid outer 27 mounted on an outer surface of the lid body 20. Here, the lid outer 27 forms a design surface of the lid 2, and includes a substantially U-shaped rib 28 that is provided on a lower surface, and a plurality of engaged portions 28a that are provided on both inner facing surfaces of the rib 28, and a plurality of locking projections 29 that are provided on a U-shaped center line. On the other hand, the lid body 20 has a pair of arm portions 22 protruding from a rear side of a flat plate 21 with a gap 20a therebetween. An upper surface of the flat plate 21 has a frame-shaped rib 23 that is disposed inside the rib 28, an engaging portion 23a that is provided on both sides of the rib 23 and engaged with the engaged portion 28a, a plurality of reinforcing ribs that is provided in the rib 23, a recess that is engaged with a locking projection 29, and the like.

In addition, an engaging piece 24 on a front side and a projection 21a (see FIG. 7) on one side thereof protrude on the lower surface of the flat plate 21. The engaging piece 24 has a locking hole 24a penetrating back and forth, and a substantially arc-shaped guide part 24b protruding from one side surface. When the lid 2 is rotated to the closed position while the guide part 24b is guided along a guide part 16b on the housing side, the lock member of the lock means L is inserted into and engaged with the locking hole 24a of the engaging piece, and thus locked at the closed position. In addition, corresponding portions of each link member 4 and 5 are rotatably connected to the left and right arm portions 22, respectively. As shown in FIG. 4, each hole 25 and 26 is coaxially provided on opposing inner surfaces of each arm 22 with an interval back and forth. Among those, the hole 25 is positioned in front of the hole 26, and is fitted to the corresponding upper shaft 44 of the first link member 4 described later. The hole 26 is fitted to the corresponding upper shaft 54 of the second link member 5 described later.

Figure 5A:
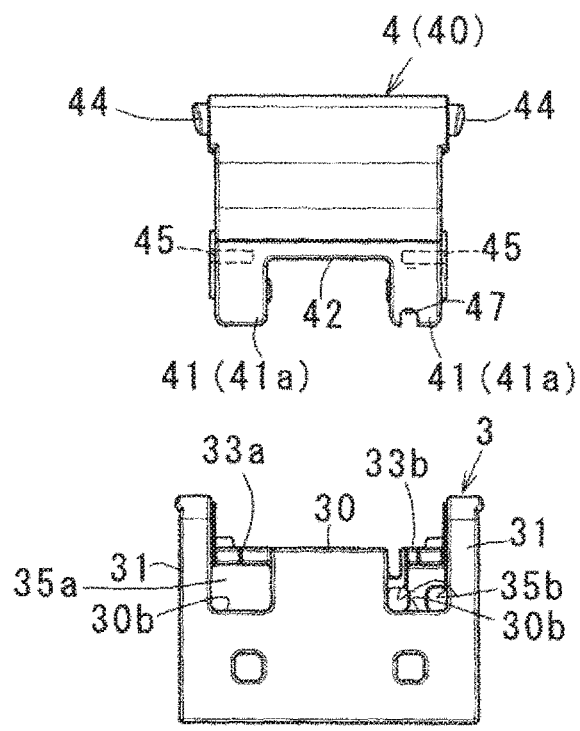
FIGS. 5(a), 5(b), and 5(c) are schematic diagrams showing a base member and a first link member as viewed from the front, back, and side surfaces.
Figure 5B:
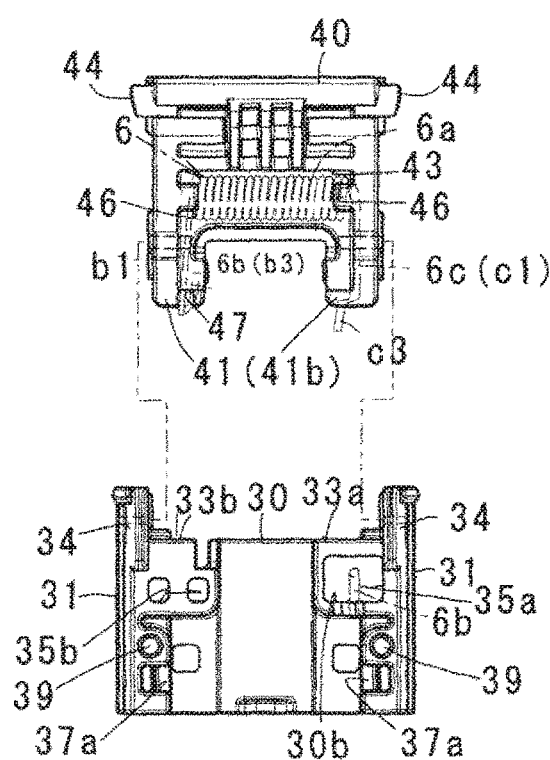

The base member 3 has a substantially rectangular plate shape that is received in the recess 14, and includes a substantially U-shaped central portion 30 and side walls 31 and 31 connected via connection parts 33a and 33b or the like corresponding to both sides of the U-shaped central portion 30 as shown in FIG. 4 and FIGS. 5(a) to 5(c). A window 35a penetrating back and forth is provided under one connection part 33a. Two small windows 35b which are open back and forth is provided back and forth under the other connection part 33b. That is, as shown in FIG. 5(a), the window 35a is formed as a rectangular cavity that penetrates back and forth below the connection part 33a, and a bottom surface 30b of the cavity communicates back and forth. On the other hand, a window 35b is provided as a rectangular cavity (the bottom surface 30b of the cavity does not communicate back and forth) which is under-filled from the front surface to the back surface under the connection part 33b, with the back side being closed, and is formed on the back surface.

Also, each side wall 31 has the groove portion 32 that is provided on the outer surface and engaged with the ridge 17, a position exit protrusion 34 that protrudes above the back surface and is fitted to the overhanging part 14b, and a mounting hole 39 that is provided under the back surface. Each side wall 31 has a pin insertion hole 36 that is positioned above the groove portion 32 and penetrates on left and right coaxial lines, and a shaft hole 37 that is positioned on an inner lower side and penetrates on the left and right coaxial lines from the inner surface to the groove portion 32. Reference numeral 37a is a guide groove for fitting a shaft 55 of a second link member described later into the hole 37.

Figure 5C:
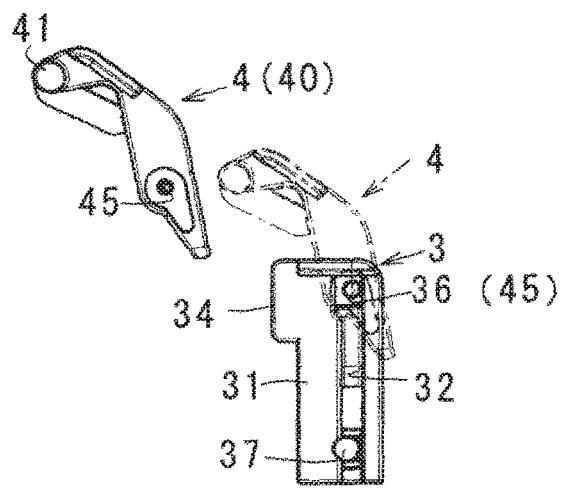
Figure 6A:
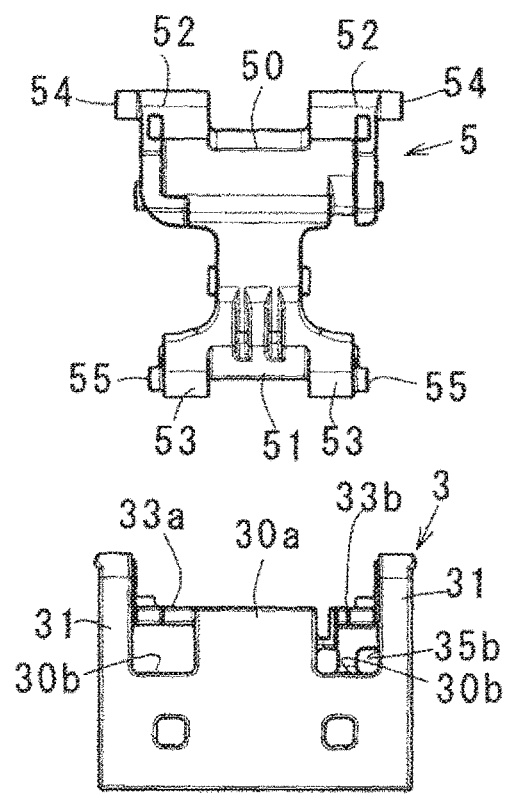
FIGS. 6(a), 6(b), and 6 (c) are schematic diagrams showing the base member and a second link member as viewed from front, back, and side surfaces.
Figure 6B:
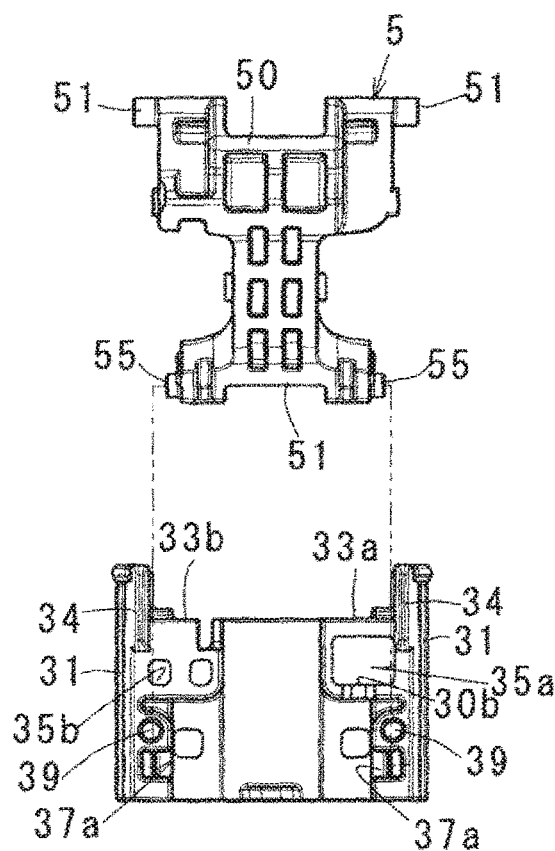
Figure 6C:
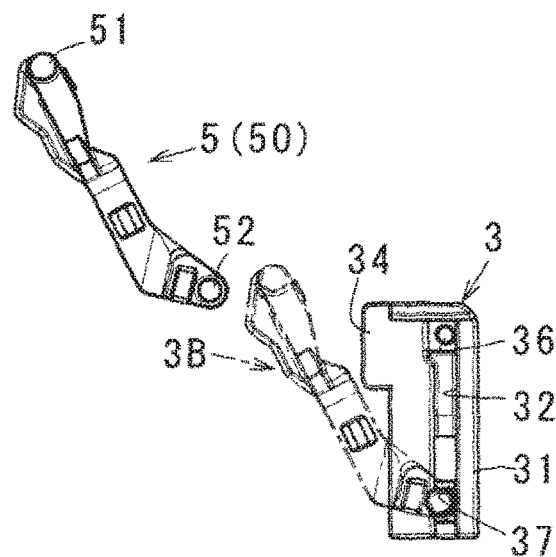

The first link member 4 and the second link member 5 are rotatably supported with respect to the base member 3. That is, as shown in FIG. 5(c), the first link member 4 has a substantially rectangular shape in a side view, and an outer surface side is a design surface and an inner surface side is an urging member disposition portion. In regard to shape, the first link member 4 has an upper plate portion 40 and the leg portions 41 and 41 protruding obliquely downward from both lower sides of the plate portion 40. The plate portion 40 has shafts 44 and 44 that coaxially protrude on upper both sides thereof, holes 45 and 45 that coaxially penetrate on lower both sides, and support shaft portions 46 and 46 that are provided on both inner sides in a left and right opposed state. One of the respective leg portions 41 is disposed in the cavity forming the window 35a described above, and the other is disposed in the cavity in front of the surface forming the small window 35b. Reference numeral 47 is a guide groove that is provided in the middle of the lower end of one leg portion 41.

As shown in FIG. 4, the first link member 4 described above is disposed so that a pin P is rotatably fitted to the hole 45 from a base member side insertion hole 36 in the state in which the holes 45 on both sides of the base member 3 overlap with the corresponding insertion holes 36 of the base member. At this time, a twist coil spring as the urging member 6 is incorporated. In the urging member 6, a winding part (coil part) 6a is slightly longer than an interval between the support shaft portions 46 of the base member.

One end 6b side has a tip portion bent into a substantially U shape, and includes a first node b1 that is connected to the winding part 6a, a second node b2 that is bent into an L shape from the first node b1, and a third node b3 that is bent in an L shape from the second node b2. On the other hand, the other end 6c is bent into a shape like a single piece constituting the tip portion in a swastika shape, and includes a first node c1 that is connected to the winding part 6a, second node c2 that is bent in an L shape from the first node b1, and a third node c3 that is bent substantially parallel to the first node c1 from the second node c2. In this example, the third node b3 of one end 6b is directed substantially in the direction of the winding part 6a, but the third node c3 of the other end 6c is directed substantially in the direction away from the winding part 6a.

The above urging member 6 is stably supported inside the first link member 4 in a state in which both sides of the winding part 6a are fitted to the corresponding support shaft portions 46. The one end 6b has the first node b1 and the second node b2 that are disposed on a front side from a front cavity on the small window 35b side, and the third node b3 that is drawn in a direction along the outer surface 41a side through the guide groove 47 from an inner surface 41b side of the corresponding leg portion 41. The other end 6c has the first node c1 that abuts on the inner surface 41b of the corresponding leg portion 41, the second node c2 that is disposed on the window 35a from the front cavity, and the third node c3 that is drawn downward along a window frame end surface of the window 35a.

Figure 9:
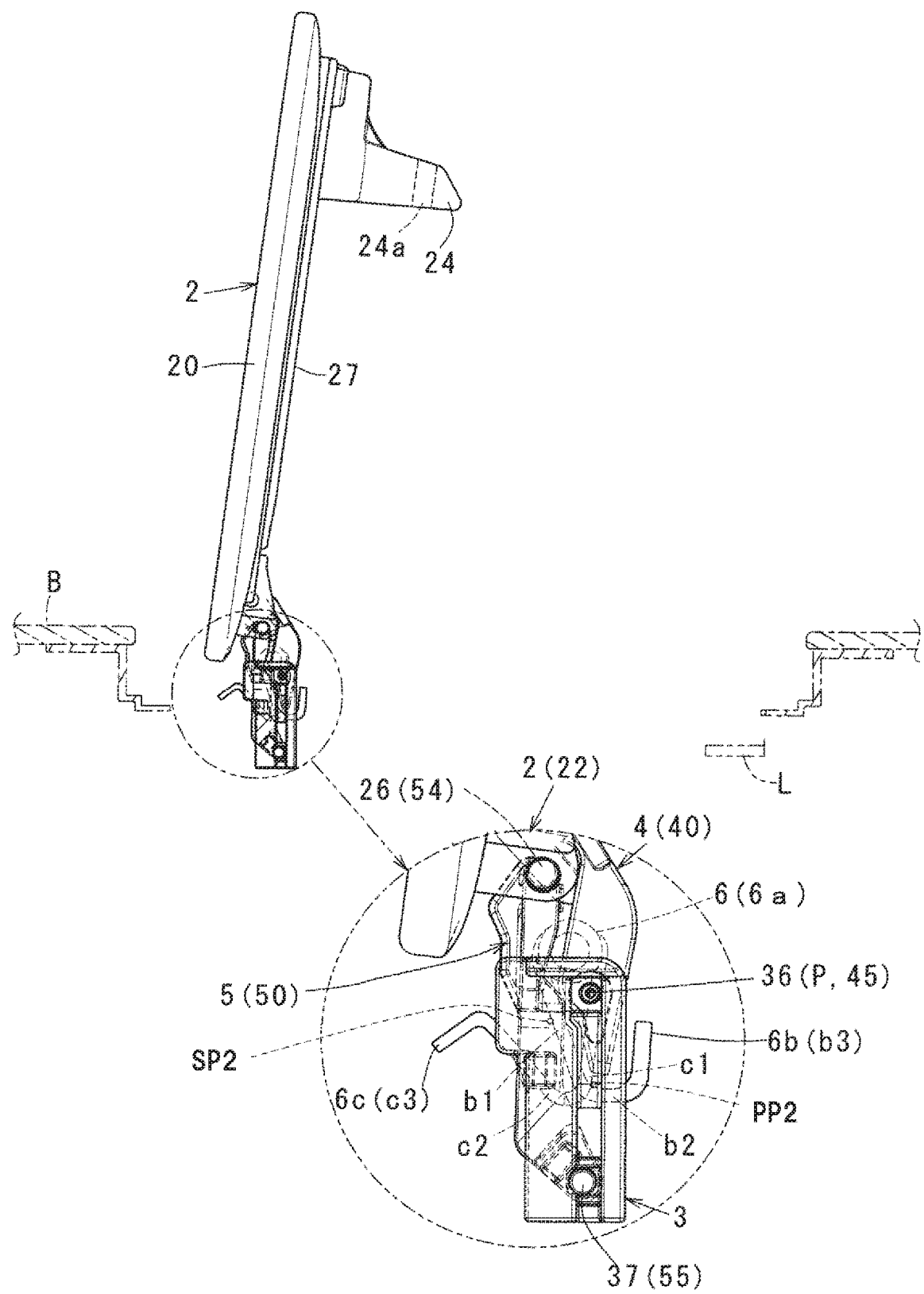
FIG. 9 is a schematic diagram showing the lid device at a second reference position of the lid.

In the assembled state (the lid 2 is at the first reference position in FIG. 8), one end 6b has a tip (third node b3) that is in contact with the outer surface 41a of the corresponding leg portion 41 from the cavity of the small window 35b. In the process in which the lid 2 is rotated against the urging force from the first reference position to the second reference position, the other end 6c is in contact with the inner surface 41a of the leg portion 41 on the side corresponding to the first node c1, strongly pushed on the leg portion 41 by the rotation, and is in a state in which the second node c2 and the first node c3 greatly protrudes outward from the window 35 as shown in FIG. 9. In this process, the other end 6c accumulates the urging force between the second node c2 and the winding part 6a. After the lid 2 is rotated from the first reference position to the second reference position, the urging force can automatically rotate the lid 2 to the fully open position (FIG. 10) as designed.

On the other hand, as shown in FIGS. 4 and 6(a) to 6(c), the second link member 5 has a wide upper portion 50, a narrow lower portion 51, and protrusions 52 and 52 protruding from both sides of the upper portion 50. A shaft 54 coaxially protrudes on outer surfaces of each protrusion 52. A shaft 55 coaxially protrudes on both outer surfaces of the lower portion 51.

In the second link member 5 described above, each protrusion 52 is disposed between the arms 22 of the lid with respect to the lid body 20, and the shaft 54 is rotatably fitted to the corresponding hole 26. In addition, each lower shaft 55 is rotatably fitted and connected to the corresponding hole 37 of the base member.

As described above, in a state in which each link member 5 and 6 is assembled in the base member 3 and each leg portion 22 of the lid body 20, the base member 3 is pressed-in so that the groove portions 32 on both sides with respect to the recess 14 of the housing are fitted to the ridge 17. Then, the base member 3 is positioned in the state in which the protrusion 34 on the back surface side abuts on a regulating projection 14b, and is mounted on the recess 14 by the engagement of the ridge 17 and the groove portion 32. Note that the base member 3 is fastened and fixed by a stopper such as a screw (not shown), if necessary. In this operation, the stopper is screwed into the mounting hole 14c and the mounting hole 39 of the base member from the outside of the housing 1.

(Operation) The operation of the lid device described above will be clarified with reference to FIGS. 1(a) and 1(b) and FIGS. 2 and 7 to FIG. 10.

Figure 2:
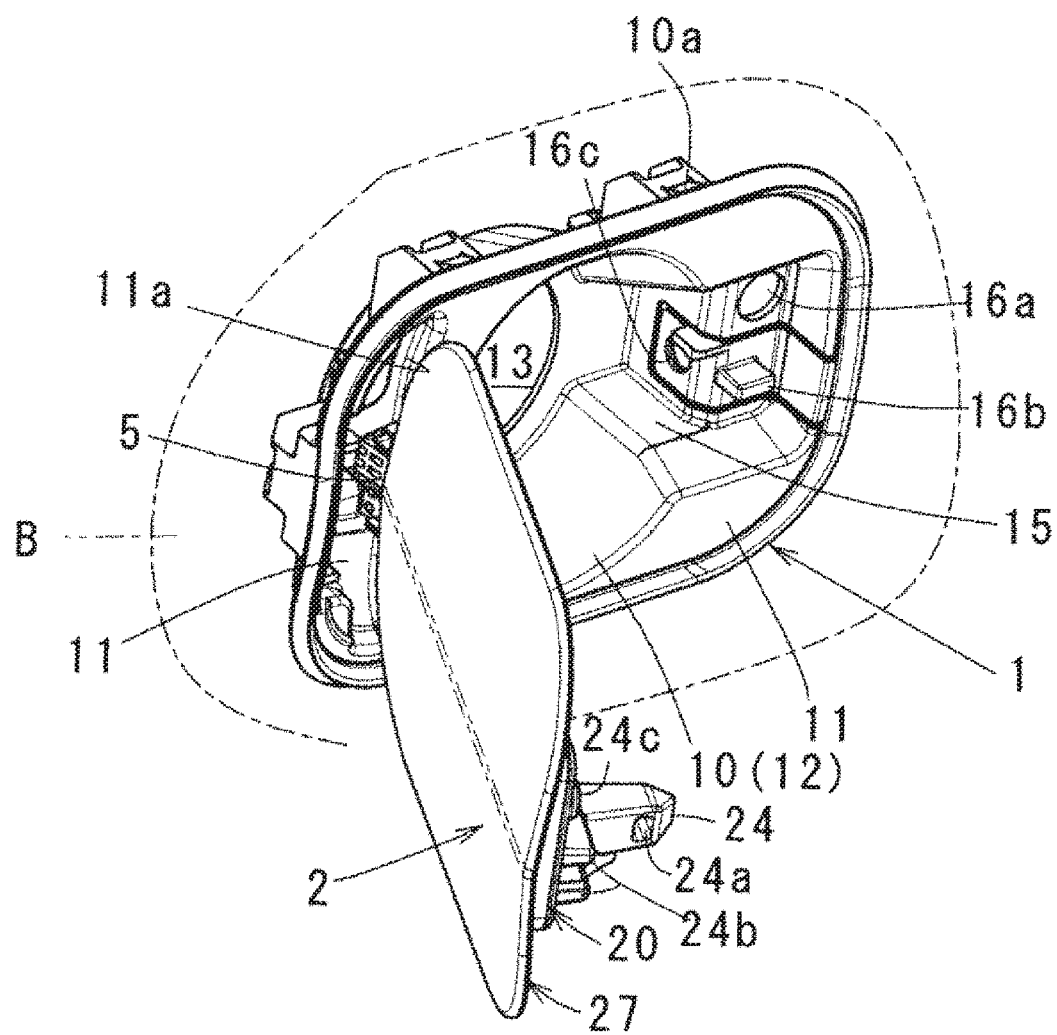
FIG. 2 is a schematic view shown in a fully open position of the lid.

(1) In this lid device, the lid 2 is switched between the closed position shown in FIGS. 1(a) and 7 at which the lid 2 is substantially flush with the body B of the vehicle body and the fully open position shown in FIGS. 2 and 10. Here, first, in the closed position, the lid 2 is locked by the lock member against the urging force accumulated between the winding part 6a of the urging member 6 and one end 6b.

That is, in this structure, in the assembled state shown in FIG. 8, one end 6b of the urging member has the tip (third node b3) in contact with the outer surface 41a of the corresponding leg portion 41 from the cavity of the small window 35b. In the process in which the lid 2 is rotated from the first reference position shown in FIG. 8 to the closed position, the first link member 4 is rotated in a direction approaching the lid body 20, that is, counterclockwise. Then, since one end 6b has the first node b1 and the second node b2 that are not in contact with the base member side and the third node b3 that abuts on the outer surface 41a of one leg portion 41 which is the abutting portion for pop-up, the abutting portion becomes a main point and accumulates the urging force with the winding part 6a. The lid 2 is stably held at the closed position locked by the lock member by the accumulated urging force without rattling. Note that at the closed position and the first reference position of the lid 2, the other end 6c abuts on the lower back surface of the window 35a penetrating back and forth under the connection part 33a (spring fixing point). Further, the lock member protrudes to and engages with the locking hole 24a at the closed position of the lid 2 and locks the lid 2 in the closed state, and can rotate the lid 2 in the opening direction by unlocking.

(2) In FIGS. 1(b) and 8, the lid 2 is rotated to the first reference position by the urging force accumulated in the urging member 6 by the unlocking. The first reference position is in a state in which the lid 2 slightly floats from the opening of the body of the vehicle body, and a user's fingertip is put in a gap from the body B as shown by one dot chain line to rotate the lid 2 in the opening direction. In this state, since the first node b1 of one end 6b abuts (fixing point) on the connection part 33b and the other end 6c abuts (spring fixing point) on the lower back surface of the window 35a, the urging member 6 is held in a half-open state.

(3) FIG. 9 shows a state in which the lid 2 is rotated from the first reference position in FIG. 8 to the second reference position that is further set in the opening direction. In the process in which the lid 2 is rotated to the second reference position, the other end 6c is moved into the cavity of the leg portion 41 in the state in which the first node c1 abuts on the inner surface 41b of the corresponding leg portion as described above and is pressed to the back surface, and the second node c2 and the first node c3 protrude greatly outward from the window 35 as shown in FIG. 9. In this process, the other end 6c, in particular, accumulates a predetermined urging force between the second node c2 and the winding part 6a.

In this structure, for example, after the lid 2 is rotated against the urging force from the first reference position to the second reference position, the lid 2 can be automatically rotated from the second reference position to the fully open position by the urging force accumulated between the second node c2 and the winding part 6a described above. In addition, when the lid 2 is rotated from the fully open position to the second reference position, the urging direction is reversed, and then, the lid 2 can be automatically rotated from the second reference position to the first reference position.

(4) In addition, in this structure, the appearance is excellent, because the lid 2 is opened and closed by rotation via the first and second link members 4 and 5, so that the movement of the lid can be made compact; in the fully open position of the lid 2, the upper portion 50 of the second link member 5 abuts on the inside of the rectangle of the first link member 4; the second link member 5 is hard to see because the second link member 5 is sandwiched between the lid 2 and the first link member 4; and the first link member 5 has a flat design surface disposed between the leg portions 22, and the like. Of course, the lid device described above is easier to promote mass productivity and lightweight because the housing 1, the lid 2 (lid body 20 and the lid outer 27), the base member 3, the first link member 4, and the second link member 5 are made of resin.

Note that in FIGS. 7 and 8, reference numeral F1 indicates the urging direction to the lid, reference numeral F2 indicates a spring load, reference numeral PP1 indicates a main point (in the abutting portion for pop-up, one leg portion 41, or its outer surface 41a), reference numeral SP1 indicates a spring fixing point (in the first abutting portion for the urging member of the base member corresponding to the abutting portion for pop-up, the lower back surface of the window 35a), and reference numeral S indicates the gap. In FIGS. 8 and 9, reference numeral SP2 indicates a spring fixing point (in the second abutting portion for the urging member of the base member corresponding to the abutting portion for deadlock, the front side of the connection part 33a), and reference numeral PP2 indicates a main point (in the abutting portion for deadlock, the other leg portion 41, or its outer surface 41b).

Structure of Second Embodiment of the Present Invention

Figure 16:
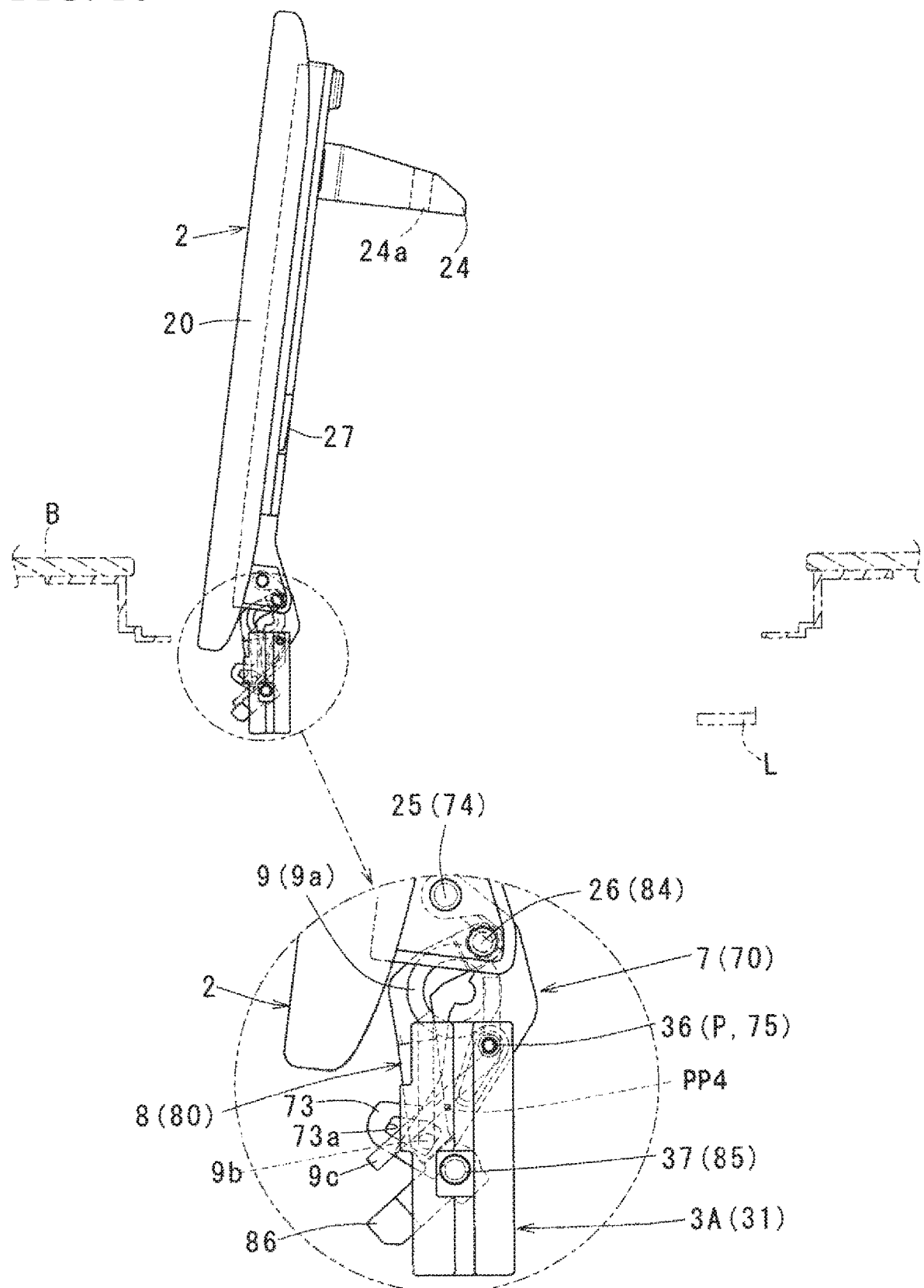
FIG. 16 is a schematic diagram showing the lid device according to the second embodiment at a second reference position of the lid.
Figure 17:
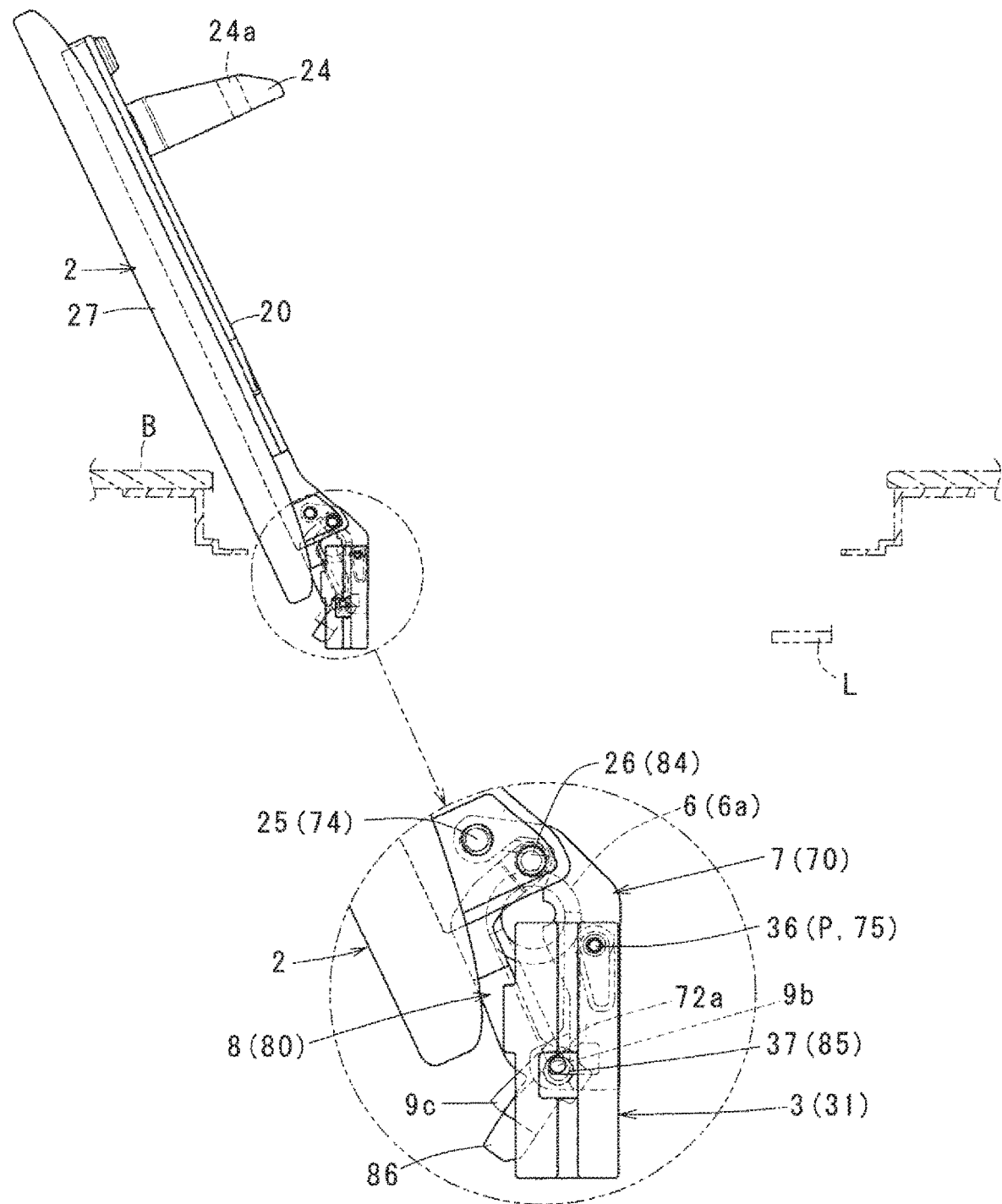
FIG. 17 is a schematic diagram showing the lid device according to the second embodiment at a fully open position of the lid.
Figure 18A:
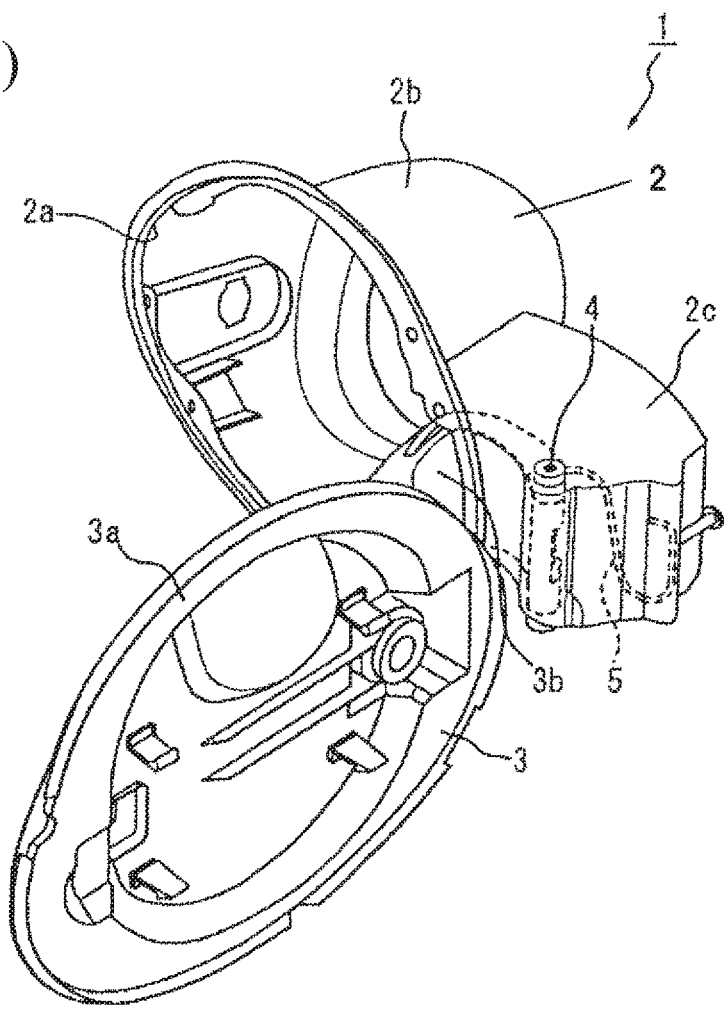
FIGS. 18(a) and 18(b) are explanatory diagrams showing FIGS. 1 and 2(a) of Patent Literature 1.
Figure 18B:
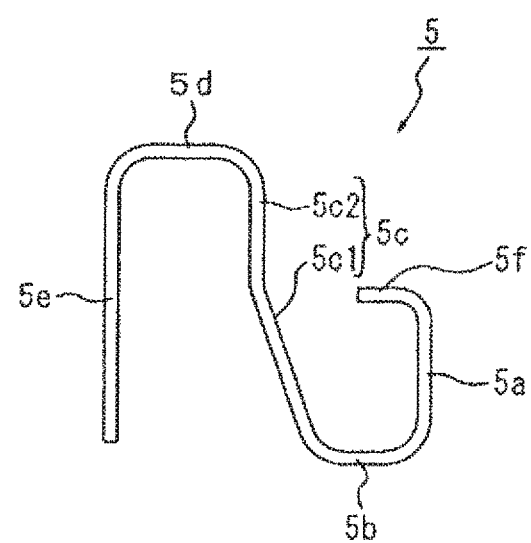
Figure 19:
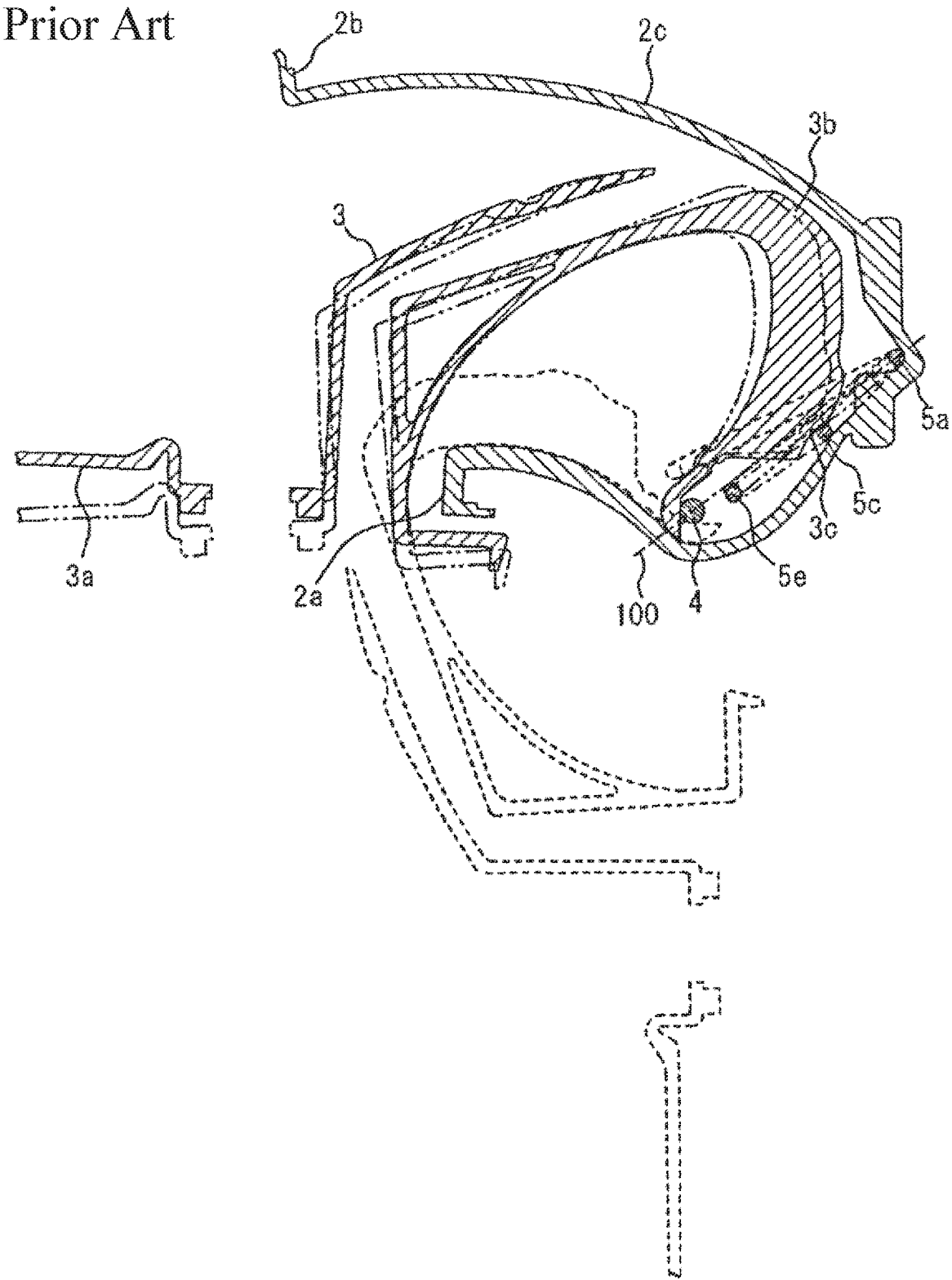
FIG. 19 is an explanatory diagram showing FIG. 4 of Patent Literature 1.

As in the first embodiment of the present invention, in FIGS. 11 to 13(c), a lid device includes a substantially container-shaped housing 1 with an upper opening that partitions a space 12, a lid 2 that opens and closes the upper opening of the housing 1, a base member 3A that is mounted on an inner periphery of the housing 1, first and second link members 7 and 8 as link members that support the lid 2 so that the lid 2 can be opened and closed with respect to the base member 3A, and an urging member 9 that is disposed between both link members 7 and 8, in which the lid 2 is rotatably supported by the housing 1 via the base member 3A and the two link members 7 and 8. The lid 2 is locked at the closed position shown in FIG. 14 by the lock member of the lock means L described above. When the locking is unlocked, the lid 2 is rotated from the closed position to a first reference position which is slightly opened as shown in FIGS. 15(*a*) and 15(*b*), by an urging force of an urging member 9. When the lid 2 is rotated in an opening direction by a hand or the like, an urging direction of an urging member 9 is reversed at a second reference position, and then, as shown in FIGS. 16 and 17, the lid 2 is rotated in a fully opening direction shown by a solid line of FIGS. 16 and 17 by the urging force of the urging member 9. Details are as follows. Note that in the second embodiment of the present invention, the housing 1 and the lid 2 are substantially the same as those in the first embodiment of the present invention, and description thereof will be omitted.

Figure 11:
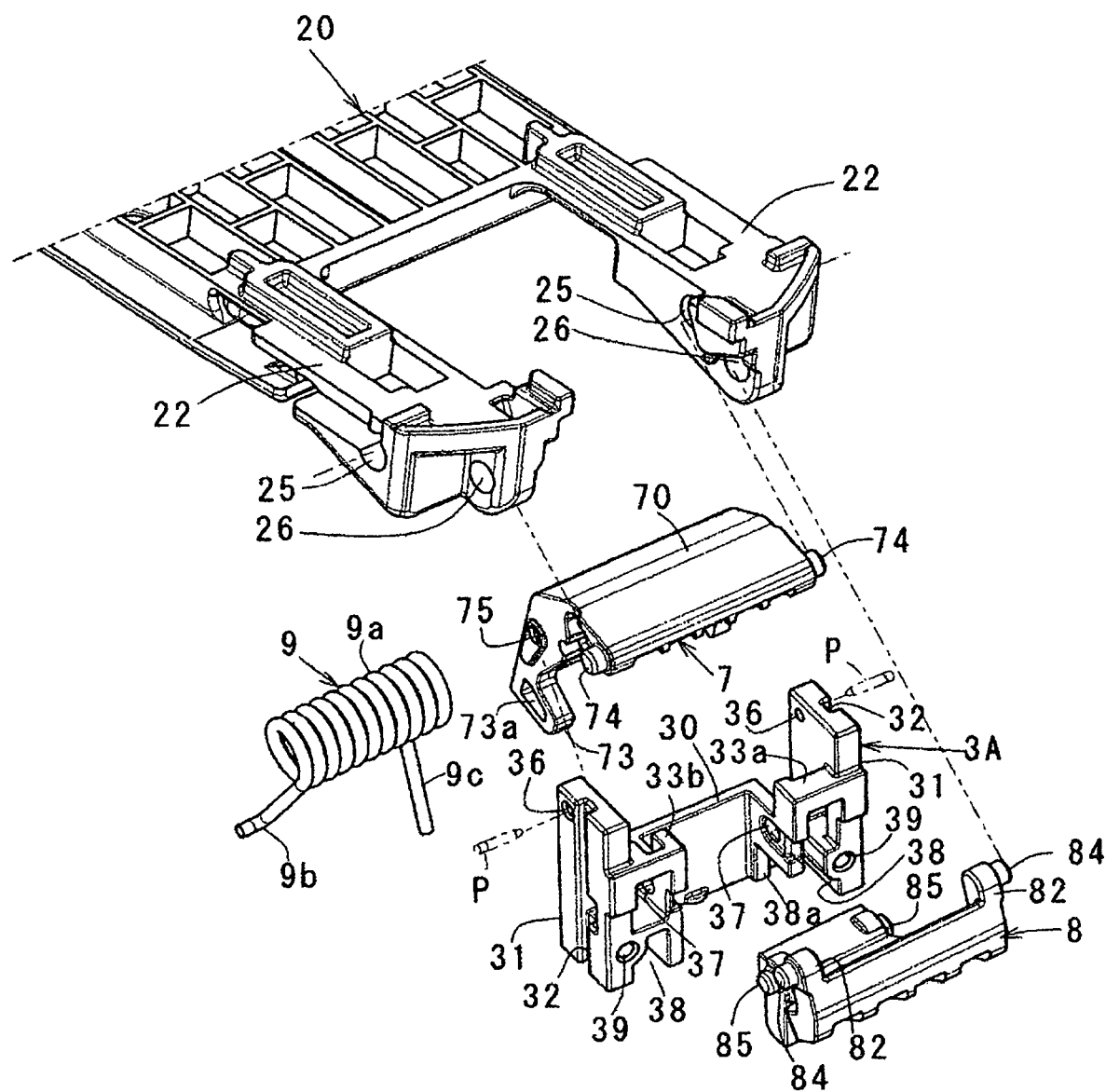
FIG. 11 is an enlarged diagram showing a lid according to a second embodiment of the present invention corresponding to FIG. 4.
Figure 12A:
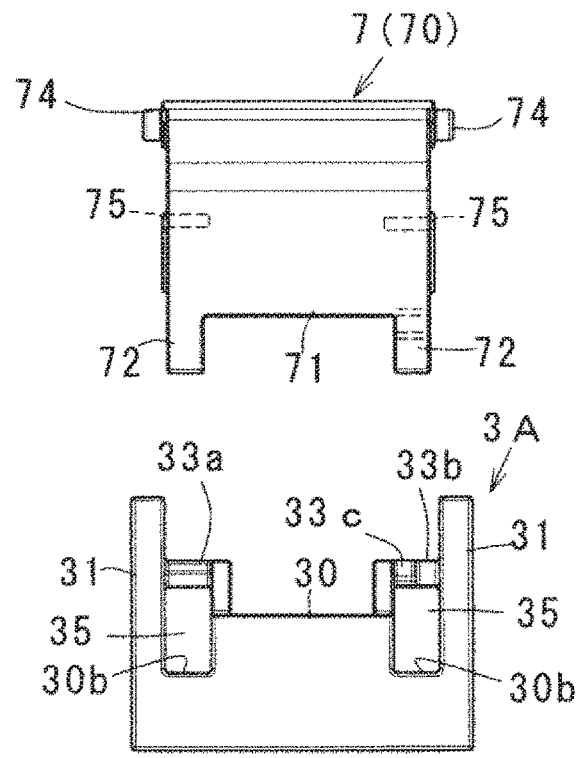
FIGS. 12(a), 12(b), and 12(c) are schematic diagrams showing the base member and the first link member in FIG. 11 as viewed from front, back, and side surfaces.
Figure 12B:
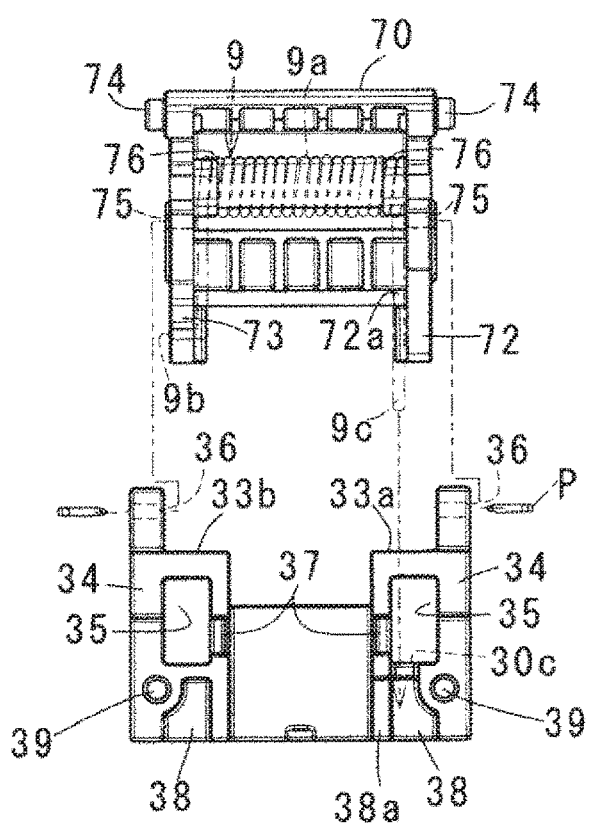
Figure 12C:
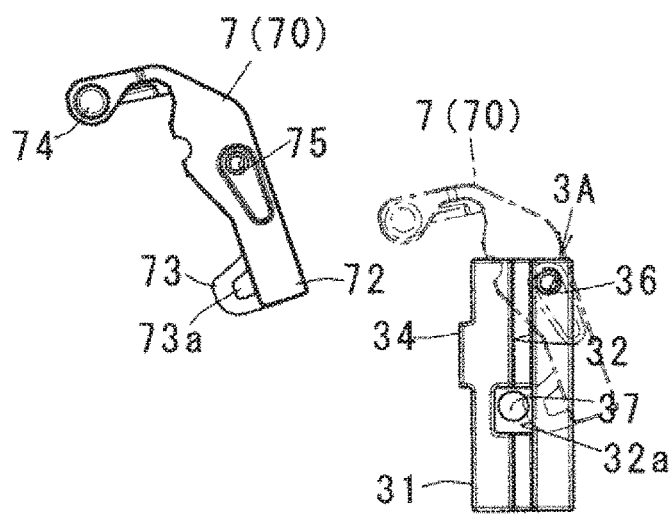

The base member 3A has a substantially rectangular plate shape that is received in the recess 14, and includes a substantially U-shaped central portion 30, side walls 31 and 31 integrated on end portions of both sides of the U-shaped central portion 30 via connection parts 33a and 33b, and the like, and recesses 38 that are positioned on back surface and provided on lower both surfaces of the central portion 30, as shown in FIG. 11 and FIGS. 12(*a*) to 12(*c*). A predetermined gap is maintained between a front wall and each side wall 31 of the central portion 30, and lower sides of each connection part 33a, 33b penetrate back and forth via a window 35. Each window 35 is a rectangular cavity that penetrates back and forth under the connection parts 33a and 33b. Reference numeral 30b denotes an inner bottom surface of the window 35. Reference numeral 33c is a guide groove that is provided on the front side of the connection part 33b and is capable of abutting on a portion between a winding part 9a and one end 9b side of the urging member described later.

In addition, each recess 38 is positioned on both lower sides of the central portion 30. As shown in FIG. 12(*b*), the left recess 38 is separated from the window 35 via a horizontal wall. On the other hand, the right recess 38 communicates with the window 35 via a vertical groove 30c. The vertical groove 30c enables the other end 9c of the urging member described later to protrude from a gap between the front wall of the central portion 30 and the corresponding side wall 31 into the right recess 38. In addition, the right recess 38 is in communication with the front wall of the central portion 30, which is formed one step lower, through a cutout portion 38a with a slight step. The cutout portion 38a enables an overhanging part 73 of the second link member 8 described later to be disposed in the recess 38.

Each side wall 31 has a groove portion 32 that is provided on an outer surface and engaged with a ridge 17 of the housing, a position exit protrusion 34 that protrudes above a back surface and abuts on the overhanging part 14b, and a mounting hole 39 that is provided under the back surface. In addition, pin insertion holes 36 penetrating on left and right coaxial lines are provided above each side wall 31. A shaft hole 37 penetrating on the left and right coaxial lines is provided on the inner side wall that partitions the window 35.

The first link member 7 and the second link member 8 are rotatably supported with respect to the base member 3A. That is, the first link member 7 has a substantially rectangular shape in a side view, and an outer surface side is a design surface and an inner surface side is an urging member disposition portion. In regard to shape, the first link member 7 has an upper plate portion 70 and leg portions 72 and 72 protruding obliquely downward from both lower sides of the plate portion 70. The plate portion 70 has shafts 74 and 74 that coaxially protrude on upper both sides thereof, holes 75 and 75 that coaxially penetrate on both sides, and support shaft portions 76 and 76 that are provided on both inner sides in a left and right opposed state. One side of the leg portion 72 is provided with the overhanging part 73 that is provided on an inner lower end surface. The overhanging part 73 is provided with a loose fitting hole 73a penetrating in the left-right direction. The other side of the leg portion 72 is provided with a stepped portion 72a which is formed one step lower and holds a portion between the other end 9c of the urging member and the winding part 9a.

As shown in FIG. 12(*b*), the first link member 7 described above is disposed so that a pin P is rotatably fitted to the hole 75 from the insertion hole 36 of the base member side in the state in which the holes 75 on both sides of the base member 3A overlaps with the corresponding insertion holes 36 of the base member side. At this time, a twist coil spring as the urging member 9 is incorporated. In the urging member 9, a winding part (coil part) 9a is slightly longer than an interval between the support shaft portions 76 of the base member.

One end 9b side has a tip portion bent in a substantially L shape. The other end 9c has a tip portion protruding obliquely downward. The urging member 9 is stably supported inside the first link member 7 in the state in which both sides of the winding part 9a are fitted to the corresponding support shaft portions 76. One end 9b has a middle portion passing through the vertical groove 30c, and the tip inserted into the loose fitting hole 73a of the overhanging part. The other end 9c is swingably inserted into the corresponding recess 38 from the upper side of the back surface of the first link member through the vertical hole 30c.

Figure 13A:
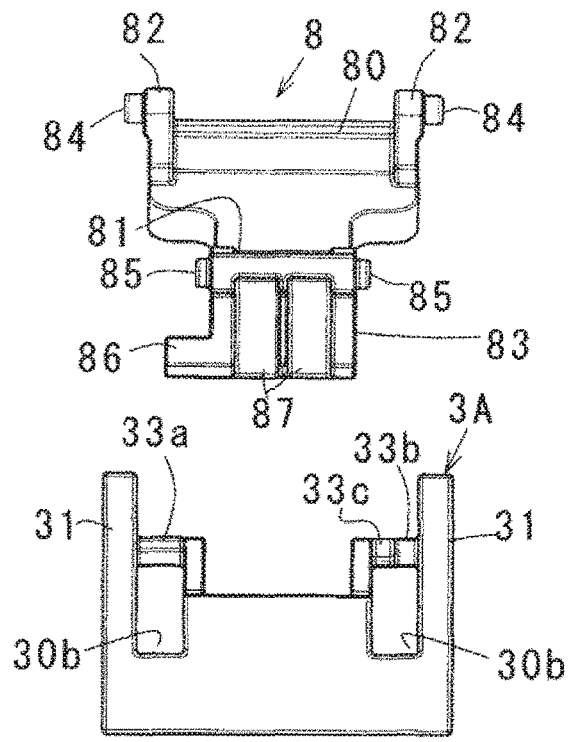
FIGS. 13(a), 13(b), and 13(c) are schematic diagrams showing the base member and the second link member in FIG. 11 as viewed from the front, back, and side surfaces.
Figure 13B:
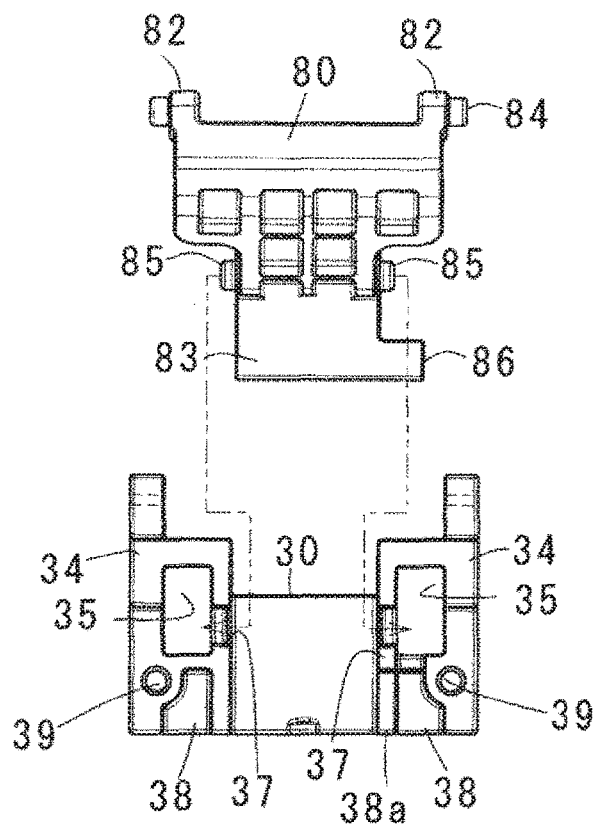
Figure 13C:
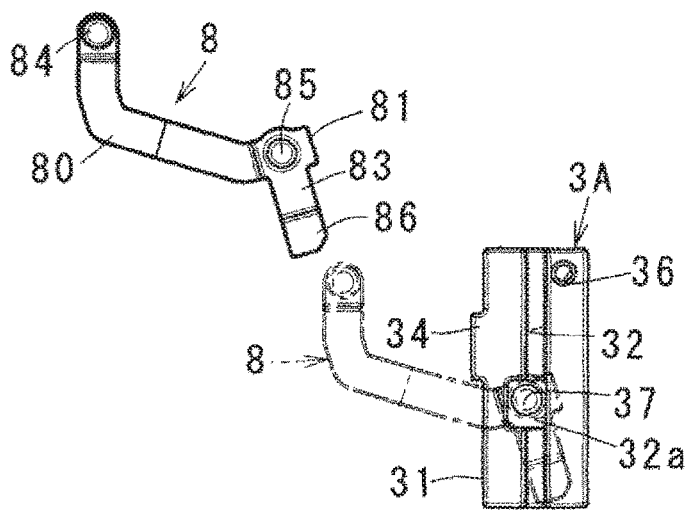

On the other hand, as shown in FIGS. 11 and 13(*a*) to 13(*c*), the second link member 8 has a wide upper portion 80, a narrow lower portion 81, protrusions 82 and 82 that protrude from upper both sides of the upper portion 80, and a bent portion 83 protruding obliquely downward from the lower portion 81. A shaft 84 coaxially protrudes on outer surfaces of each protrusion 82. A shaft 85 coaxially protrudes on both outer surfaces of the lower portion 81. An overhanging part 86 protrudes on one side of the bent portion 83 at a right angle.

In the second link member 8 described above, each protrusion 82 is disposed between the arms 22 of the lid with respect to the lid body 20, and the shaft 84 is rotatably fitted to the corresponding hole 26 of the lid body 20. In addition, each lower shaft 85 is rotatably fitted and connected to the corresponding hole 37 of the base member. Then, the overhanging part 86 is disposed in the recess 38 from the cutout portion 38a. In this state, as shown in FIGS. 14 to 17, the other end 9c of the urging member can abut on the outer surface of the overhanging part 86, or can come off the overhanging part 86 and abut on the stepped portion 72a on the first link member side. In this structure, the second link member 8 swings while a pivot part of the shaft 85 and the hole 37 is rotated as a fulcrum, and can accumulate the urging force between the other end 9c and the winding part 9a or use the accumulated urging force as the urging force for moving, that is, deadlock of each link member 7 and 8.

As described above, in the state in which each link member 7 and 8 is assembled in the base member 3A and each leg portion 22 of the lid body 20, the base member 3A is pressed-in so that the groove portions 32 on both sides with respect to the recess 14 of the housing is fitted to the ridge 17. Then, the base member 3 is positioned in the state in which the protrusion 34 on the back surface side abuts on a regulating projection 14b, and is mounted on the recess 14 by the engagement of the ridge 17 and the groove portion 32. Note that the base member 3 is fastened and fixed by a stopper such as a screw (not shown), if necessary. In this operation, the stopper is screwed into the mounting hole 14c and the mounting hole 39 of the base member from the outside of the housing 1. These are the same as the first embodiment of the present invention.

(Operation) The operation of the lid device described above will be clarified with reference to FIGS. 14 to 17.

Figure 14:
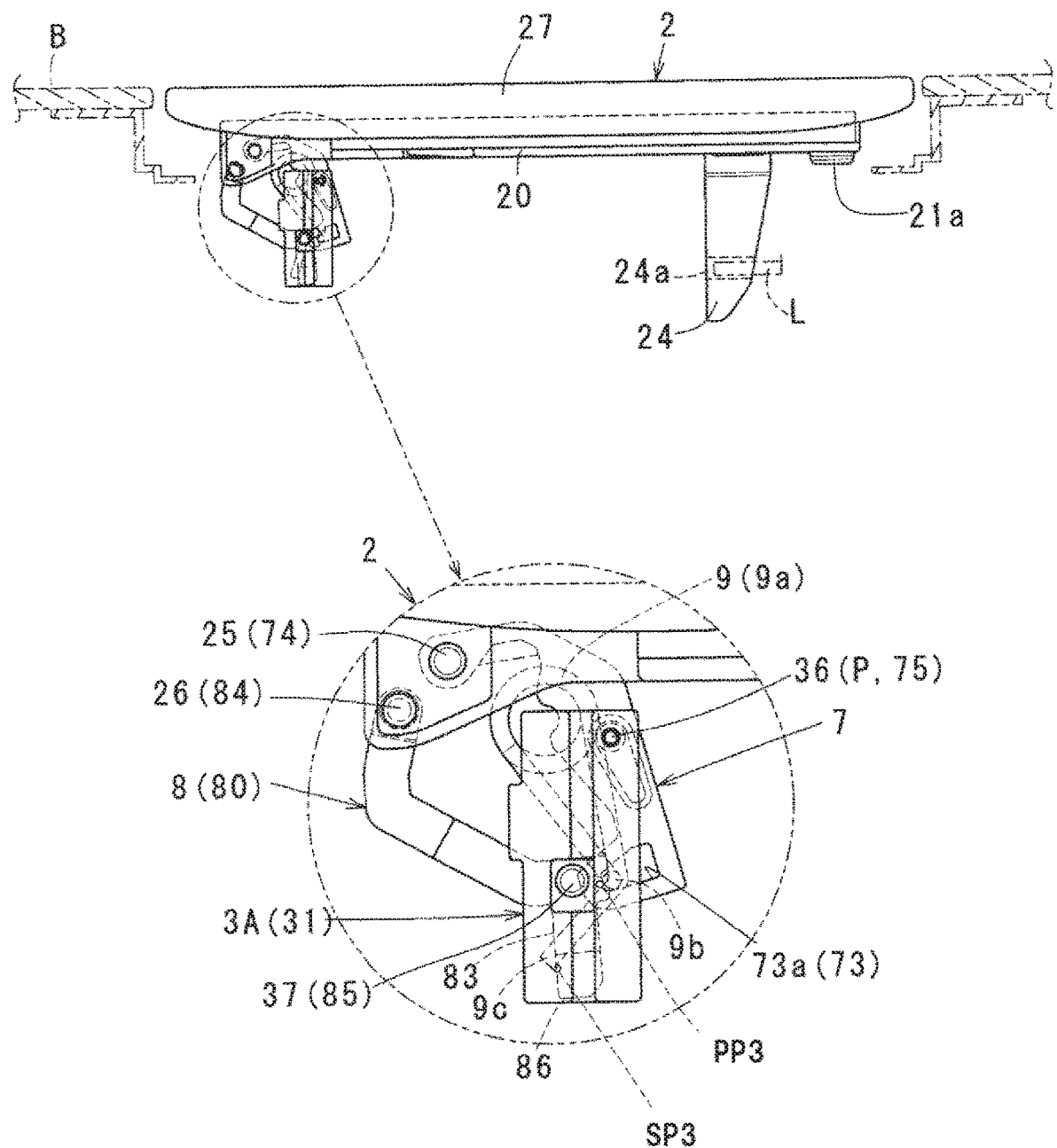
FIG. 14 is a schematic diagram showing the lid device according to the second embodiment at a closed position of the lid.

(1) In this lid device, the lid 2 is switched between the closed position shown in FIG. 14 which is substantially flush with the body B of the vehicle body and the fully open position shown in FIG. 17. First, in the closed position, the lid 2 is locked by the lock member of the lock means L against the urging force accumulated between the winding part 9a of the urging member 9 and one end 9b.

Figure 15A:
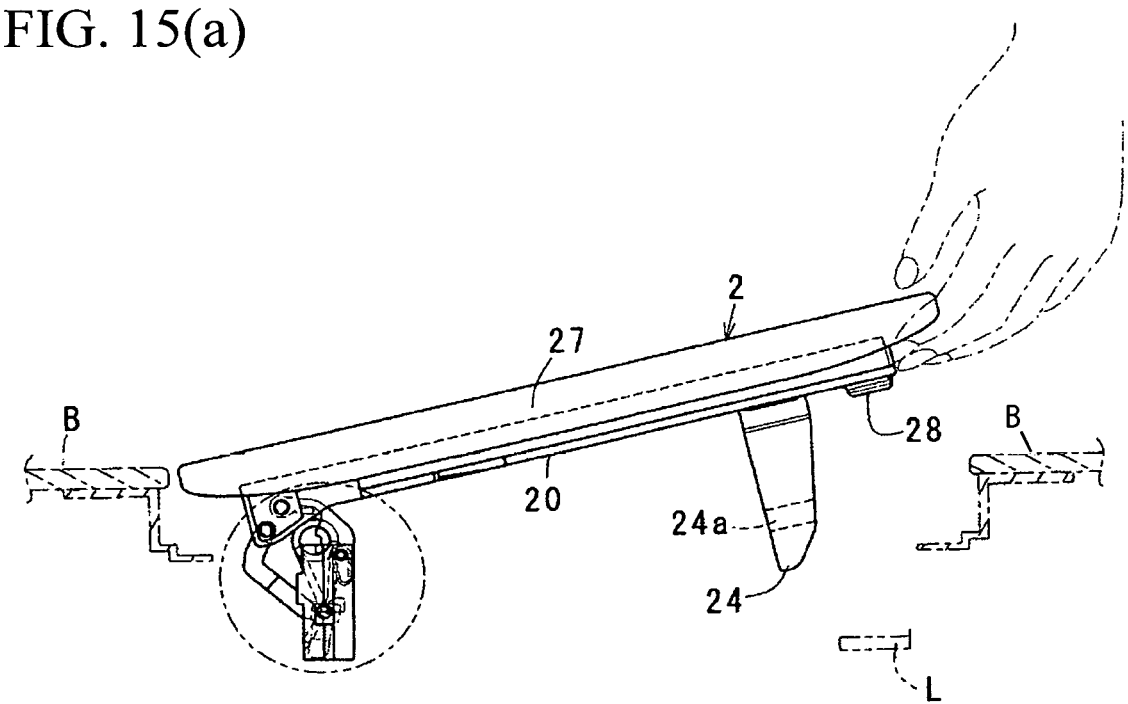
FIG. 15(a) is a schematic diagram showing the lid device according to the second embodiment at a first reference position of the lid.
Figure 15B:
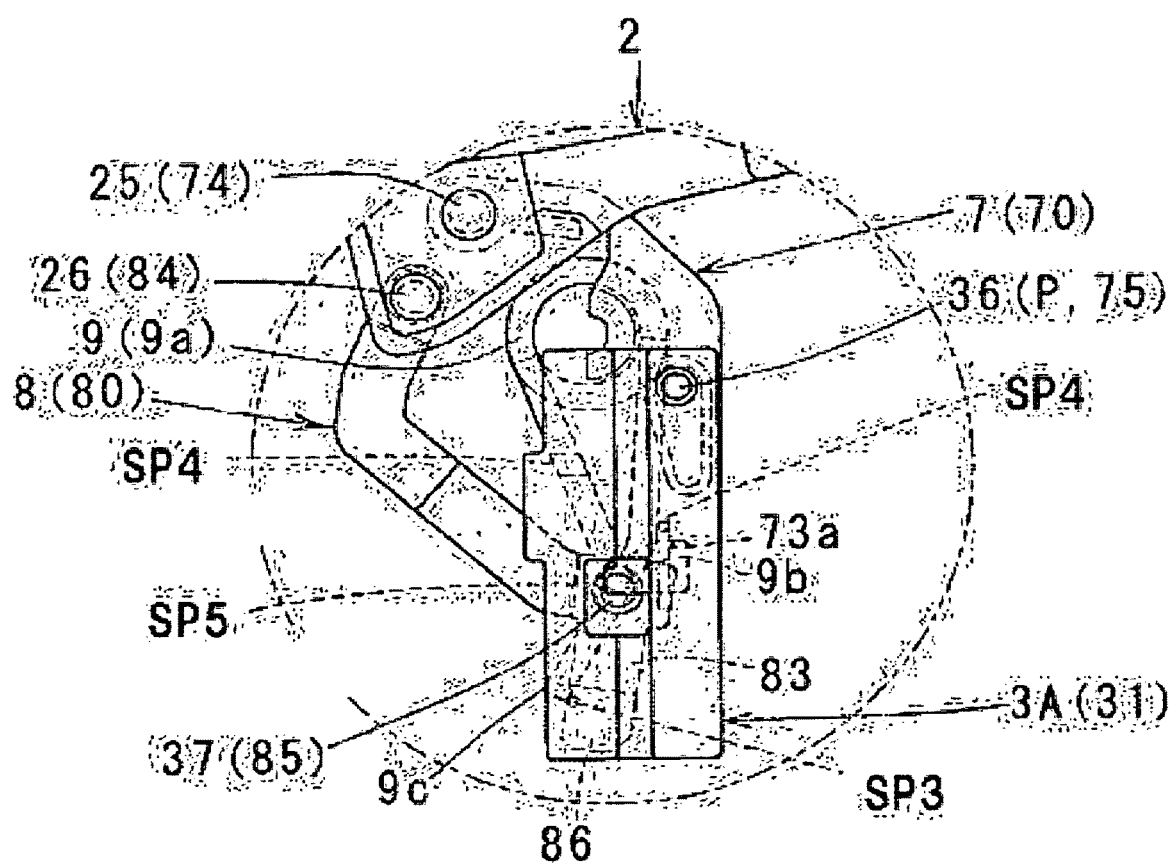
FIG. 15(b) is a part of FIG. 15(a).

That is, in this structure, in the assembled state shown in FIGS. 15(a) and 15(b), one end 9b of the urging member is fitted to the loose fitting hole 73a of the overhanging part 73 on the first link member side, and contacts the corresponding inner end surface of the loose fitting hole 73a which is the abutting portion for pop-up. In the process in which the lid 2 is rotated from the first reference position shown in FIGS. 15(a) and 15(b), to the closed position shown in FIG. 14, the first link member 7 is rotated in a direction approaching the lid body 20, that is, counterclockwise. Then, one end 9b is also pushed to the corresponding inner end surface of the loose fitting hole 73a, and accumulates the urging force between the one end 9b and the winding part 9a. The lid 2 is stably held at the closed position locked by the lock member by the accumulated urging force without wobbling. Note that at the closed position and the first reference position of the lid 2, the other end 9c abuts (spring fixing point) on the outer surface of the overhanging part 86 of the second link member. Further, the lock member protrudes to and engages with the locking hole 24a at the closed position of the lid 2 and locks the lid 2 in the closed state, and can rotate the lid 2 in the opening direction by unlocking.

(2) In FIGS. 15(a) and 15(b), the lid 2 is rotated to the first reference position by the urging force accumulated in the urging member 9 by the unlocking. The first reference position is in a state in which the lid 2 slightly floats from the opening of the body B of the vehicle body, and a user's fingertip is put in a gap from the body B as shown by one dot chain line to rotate the lid 2 in the opening direction. In this state, the winding part 9a and one end 9b are stopped by contacting the guide groove 33c of the base member, and since one end 9b abuts (spring fixing point) on the corresponding inner end surface on the loose fitting hole 73a of the first link member side and the other end 9c abuts (spring fixing point) on the outer surface of the overhanging part 86 on the second link member side, the urging member 9 is held in the half-open state of FIGS. 15(a) and 15(b).

Note that in this state, the portion between the winding part 9a and one end 9b abuts on the guide groove 33c (spring fixing point, that is, the guide groove 33 on the base member side corresponding to the abutting portion for deadlock) of the base member 3A, and the one end 9b is elastically displaced using the abutting portion as a fulcrum. At the same time, the portion between the winding part 9a and the other end 9c abuts on the stepped portion 72a (spring fixing point, that is, abutting portion for deadlock) on the first link member side, and the other end 9c is elastically displaced using the abutting portion as a fulcrum.

(3) FIG. 16 shows a state in which the lid 2 is rotated from the first reference position in FIGS. 15(a) and 15(b) to the second reference position that is further set in the opening direction. In the process in which the lid 2 is rotated to the second reference position, the gap between the winding part 9a and the other end 9c is pressed by the stepped portion 72a of the first link member. In this process, a predetermined urging force is accumulated between the other end 9c and the winding part 9a.

In this structure, for example, the lid 2 is rotated against the urging force from the first reference position to the second reference position. Then, after passing the second reference position of FIG. 16 as shown in FIG. 17, the lid 2 can be automatically rotated to the fully open position by the urging force accumulated on the other end 9c side.

Note that in FIGS. 14 and 15, reference symbol PP3 indicates the main point (in the abutting portion for pop-up, overhanging part 73 of the first link member 7), reference symbol SP3 indicates the spring fixing point (in the first abutting portion for the urging member of the second link member corresponding to the abutting portion for pop-up, the overhanging part 86 of the second link member), reference number SP4 indicates the spring fixing point (in the first abutting portion for the urging member of the first link member corresponding to the abutting portion for pop-up, stepped portion 72a of the first link member), reference number SP4 indicates the spring fixing point (in the second abutting portion for the urging member of the base member corresponding to the abutting portion for deadlock, guide groove 33c), and reference number SP5 indicates the spring fixing point (in the second abutting portion for the urging member of the first link member corresponding to the abutting portion for deadlock, one inner end side of the loose fitting hole of the overhanging part 73). In FIG. 16, reference numeral PP4 indicates the main point (in the abutting portion for deadlock, stepped portion 72a of the first link member).

(4) Note that in this structure, the appearance is excellent, because since the lid 2 is opened and closed by the rotation via the first and second link members 7 and 8, the movement of the lid can be made compact; in the fully open position of the lid 2, the upper portion 80 of the second link member 8 approaches the inside of the rectangle of the first link member 7; the second link member 8 is hard to see because the first link member 7 is sandwiched between the lid 2 and the first link member 7; and the first link member 7 has a flat design surface disposed between the leg portions 22, and the like. These are the same as the first embodiment of the present invention.

The lid device described above can be variously modified except for the requirements specified in the claims. For example, the lid 2 may be formed by integrally forming the outer lid 27 with the lid body 20. In addition, the first link member 4 or 7 has the hole 45 or 75, and the pin P is attached to the hole 45 or 75 from the insertion hole 36 of the base member 3 using the pin P which is a shaft, but the shaft such as the shaft 44 may be provided instead of the hole and the pin, and the shaft may be directly fitted into the hole provided corresponding to the hole 45 or 75 from the insertion hole 36 of the base member side.

REFERENCE SIGNS LIST

1 Housing (10 is cylindrical part)
2 Lid (20 is lid body, 27 is lid outer)
3 Base member (30 is central portion, 31 is side wall, 35*a* is window)
3A Base member (30 is central portion, 31 is side wall)
4 First link member (40 is plate portion)
5 Second link member (50 is upper portion, 51 is lower portion)
6 Urging member (twist coil spring: 6*a* is winding part)
6*b* One end (b1 is first node, b2 is second node, b3 is third node)
6*c* Other end (c1 is first node, c2 is second node, c3 is third node)
7 First link member (70 is plate portion)
8 Second link member (80 is upper portion, 81 is lower portion)
9 Urging member (twist coil spring: 9*a* is winding part)
9*b* One end
9*c* Other end
12 Space for oil filler port or electric charging port
14 Recess (14*a* is ridge)
24 Hole
25 Hole
32 Groove portion
33*c* Guide groove (second abutting portion for urging member)
35*a* Window (lower back surface: first abutting portion for urging member)
36 Pin insertion hole
41 Leg portion (abutting portion for pop-up and deadlock)
41*a* Outer surface of leg portion (abutting portion for pop-up)
41*b* Inner surface of leg portion (abutting portion for deadlock)
44 Shaft
45 Pin hole
46 Support shaft portion
54 Shaft
55 Shaft
72*a* Stepped portion (abutting portion for deadlock)
74 Overhanging part (corresponding to abutting portion for pop-up,
73*a* is loose fitting hole)
74 Shaft
75 Pin hole
76 Support shaft portion
83 Bent portion (86 is overhanging part)
84 Shaft
85 Shaft
L Lock means
S Pin (corresponding to shaft)
B Vehicle body The entire contents of the specification, claims, drawings, and abstract of Japanese Patent Application No. 2017-137838, filed on Jul. 14, 2017, are hereby incorporated by reference as the disclosure of the specification of the present invention.

What is claimed is:

1. A vehicle lid device, comprising:
   a housing in which an oil filler port or an electric charging port is disposed inside an opening;
   a lid that opens and closes the opening of the housing;
   a link member that connects and supports the lid to the housing so as to be openable and closable; and
   an urging member that moves, by an urging force, the lid from a closed position to a first reference position at which the lid is in a middle of opening, and moves, by the urging force, the lid from a second reference position which is positioned further in an opening direction than the first reference position to a fully open position,
   wherein the link member includes a first link member directly connecting the lid and an upper portion of a base member provided in the housing, and a second link member directly connecting the lid and a lower portion of the base member, and
   the urging member includes an abutting portion for pop-up that switches the lid from the closed position to the first reference position, and an abutting portion for deadlock that switches urging to the first reference position and urging to the fully open position, with the second reference position interposed between the first reference position and the fully open position.

2. The vehicle lid device according to claim 1, wherein the urging member is disposed between the first link member and the base member, the abutting portion for pop-up is disposed on a lid side of the first link member, and the abutting portion for deadlock is disposed on a base member side of the first link member.

3. The vehicle lid device according to claim 1, wherein the second link member has a first abutting portion for the urging member corresponding to the abutting portion for pop-up, and the base member has a second abutting portion for the urging member corresponding to the abutting portion for deadlock.

4. The vehicle lid device according to claim 1, wherein the urging member is a torsion coil spring.

5. The vehicle lid device according to claim 1, wherein the base member has a rectangular shape projecting from the housing, and includes side walls and a central portion between the side walls.

6. A vehicle lid device, comprising:
   a housing in which an oil filler port or an electric charging port is disposed inside an opening;
   a lid that opens and closes the opening of the housing;
   a link member that connects and supports the lid to the housing so as to be openable and closable; and
   an urging member that moves, by an urging force, the lid from a closed position to a first reference position at which the lid is in a middle of opening, and moves, by the urging force, the lid from a second reference position which is positioned further in an opening direction than the first reference position to a fully open position,
   wherein the link member includes a first link member and a second link member where each one end is pivotally supported on a back side of the lid and each another end is pivotally supported by a base member provided in the housing,
   the urging member includes an abutting portion for pop-up that switches the lid from the closed position to the first reference position, and an abutting portion for deadlock that switches urging to the first reference position and urging to the fully open position, with the second reference position interposed between the first reference position and the fully open position, and
   the urging member is disposed between the first link member and the second link member, the abutting portion for pop-up is a predetermined portion of the first link member, and the abutting portion for deadlock is a predetermined portion of the first link member.

7. A vehicle lid device, comprising:

a housing in which an oil filler port or an electric charging port is disposed inside an opening;

a lid that opens and closes the opening of the housing;

a link member that connects and supports the lid to the housing so as to be openable and closable; and an urging member that moves, by an urging force, the lid from a closed position to a first reference position at which the lid is in a middle of opening, and moves, by the urging force, the lid from a second reference position which is positioned further in an opening direction than the first reference position to a fully open position, wherein the link member includes a first link member and a second link member where each one end is pivotally supported on a back side of the lid and each another end is pivotally supported by a base member provided in the housing, the urging member includes an abutting portion for pop-up that switches the lid from the closed position to the first reference position, and an abutting portion for deadlock that switches urging to the first reference position and urging to the fully open position, with the second reference position interposed between the first reference position and the fully open position, and the base member has a first abutting portion for an urging member corresponding to the abutting portion for pop-up, and a second abutting portion for an urging member corresponding to the abutting portion for deadlock.

8. The vehicle lid device according to claim 7, wherein the first abutting portion for the urging member is a surface disposed on a side of the second link member of the base member, and the second abutting portion for the urging member is a surface disposed on a side of the first link member of the base member.

* * * * *